United States Patent
Washington

(10) Patent No.: US 7,151,454 B2
(45) Date of Patent: Dec. 19, 2006

(54) SYSTEMS AND METHODS FOR LOCATION OF OBJECTS

(75) Inventor: Richard G. Washington, Marble Falls, TX (US)

(73) Assignee: CoVi Technologies, Austin, TX (US)

(*) Notice: Subject to any disclaimer, the term of this patent is extended or adjusted under 35 U.S.C. 154(b) by 37 days.

(21) Appl. No.: 10/732,174

(22) Filed: Dec. 10, 2003

(65) Prior Publication Data

US 2004/0169587 A1 Sep. 2, 2004

Related U.S. Application Data

(60) Provisional application No. 60/437,713, filed on Jan. 2, 2003.

(51) Int. Cl.
*G08B 13/14* (2006.01)

(52) U.S. Cl. ............... 340/572.1; 340/573.1; 340/572.4; 340/572.7; 348/139; 348/169

(58) Field of Classification Search ............ 340/572.1, 340/573.1, 572.7, 572.4; 348/169, 135, 139, 348/143; 455/41.2
See application file for complete search history.

(56) References Cited

U.S. PATENT DOCUMENTS

| | | | | |
|---|---|---|---|---|
| 5,268,734 A | * | 12/1993 | Parker et al. | 356/139.06 |
| 5,561,519 A | * | 10/1996 | Parker et al. | 356/139.06 |
| 5,977,913 A | | 11/1999 | Christ | 342/465 |
| 6,069,564 A | | 5/2000 | Hatano et al. | 340/572.7 |
| 6,127,917 A | * | 10/2000 | Tuttle | 340/10.1 |
| 6,173,119 B1 | | 1/2001 | Manico et al. | 396/6 |
| 6,184,841 B1 | | 2/2001 | Shober et al. | 343/853 |
| 6,396,438 B1 | | 5/2002 | Seal | 342/127 |
| 6,509,829 B1 | * | 1/2003 | Tuttle | 340/10.1 |
| 6,705,522 B1 | * | 3/2004 | Gershman et al. | 235/385 |
| 6,791,603 B1 | * | 9/2004 | Lazo et al. | 348/169 |
| 2002/0089434 A1 | | 7/2002 | Ghazarian | 340/568.1 |
| 2002/0165758 A1 | | 11/2002 | Hind et al. | 705/10 |
| 2004/0098276 A1 | * | 5/2004 | Blazey et al. | 705/1 |
| 2004/0124982 A1 | * | 7/2004 | Kovach | 340/572.1 |
| 2004/0169589 A1 | * | 9/2004 | Lea et al. | 340/825.49 |
| 2005/0128293 A1 | * | 6/2005 | Wilsey et al. | 348/143 |

OTHER PUBLICATIONS

Recording/Playback Software Free Inside Every Iqeye3, Bright Noise, http://www.brightnoise.com/article.php?sid=80&mode=thread&order=0, (Posted: Oct. 24, 2003), printed off Internet on Aug. 2, 2004, 5 pgs.

IQinVision Press Release, IQinVision Announces The Availability Of IQecorder, The Complete IP Video Network System, file://C:\docume~1\Wes\Locals~1\Temp\N2WIRn4T.htm, (Jan. 26, 2004), printed off Internet Aug. 2, 2004, 2 pgs.

IQrecorder Wins Award For Best IP Hardware At IIPSec, The Complete IP Video Network System, http://www.livesecure.nl/readon.php?content_id=42&categoryid=4, (Feb. 3, 2004), printed off Internet Aug. 2, 2004, 1 pg.

(Continued)

*Primary Examiner*—Toan N. Pham
(74) *Attorney, Agent, or Firm*—O'Keefe, Egan & Peterman, LLP

(57) ABSTRACT

Systems and methods that may be employed to visually locate and/or track objects equipped with active RFID tags. The disclosed systems and methods may employ an articulated camera/s, such as closed circuit television ("CCTV") or other suitable type of articulated camera/s, that is equipped with an antenna array.

93 Claims, 10 Drawing Sheets

OTHER PUBLICATIONS

Industrial Video & Control, IVC's Video Systems Are User Configurable, Upgradeable, Scaleable From 1 to 100s Of Cameras, And Are Easy to Install, http://www.ivcco.com/products, (labeled © 2003), printed off Internet Aug. 3, 2004, 3 pgs.

Industrial Video & Control, IVC's ActiveX Tools Make Integration Easy, http://www.ivcco.com/products.SCADAIntegration.html, (labeled © 2003), printed off Internet Aug. 3, 2004, 2 pgs.

IQinvision, IQeye3 Smart Camera Platform, labeled © 2002, 2 pgs.

IQinvision, IQeye3 Smart Network Camera, labeled © 2003, 2 pgs.

IQinvision, IQeye User's Guide, Mar. 11, 2002, 115 pgs.

IQinVision Press Release, IQinVision Digital Web Camera Stands Up To Sub-Zero Cold, Burning Heat, http://www.iqeye.com/news/IQ1XT1ch.htm, (Sep. 27,1999), printed off Internet Aug. 5, 2004, 2 pgs.

IQinVision Press Release, IQinVision Launches IQeye1 PC-Independent Digital Web Server Camera, http://www.igeye.com/news/IQI1Inch.htm, (Aug. 2, 1999), printed off Internet Aug. 5, 2004, 2 pgs.

IQinVision Press Release, IQeye1 Camera Puts Harvey Mudd Machine Shop On Web, http://www.iqeye.com/news/hmudd.htm, (Jan. 24, 2000), printed off Internet Aug. 5, 2004, 2 pgs.

IQinVision Press Release, IQinVision IQeye Camera Puts Aquarium Of The Pacific On World Wide Web, http://www.iqeye.com/news/1baop.htm, (May 15, 2000), printed off Internet Aug. 5, 2004, 2 pgs.

IQinVision Press Release, IQinVision Launches IQeye2 And IQeye2 Industrial Internet Cameras, http://www.iqeye.com/news/IQ21nch.htm, (Oct. 30, 2000), printed off Internet Aug. 5, 2004, 2 pgs.

IQinVision Press Release, IQinVision Launches IQeye3, First Mega-Pixel Network Camera, http://www.iqeye.com/news/IQeye31nch.htm, (Apr. 30, 2001), printed off Internet Aug. 5, 2004, 2 pgs.

IQinVision Press Release, Philips CSI Selects IQinVision IQeye3 Camera For Phillips Color e-dome, http://www.iqeye.com/news/edome.htm, (Jul. 30, 2001), printed off Internet Aug. 5, 2004, 2 pgs.

IQinVision Press Release, IQinVision Selects Equator's BSP Family Of Chips To Enhance Its Smart Camera Platform, http://www.iqeye.com/news/equator.htm, (Apr. 17, 2002), printed off Internet Aug. 5, 2004, 2 pgs.

IQinVision Press Release, IQinVision Adopts RCC1S Real-Time MPEG-4 Encoder, http://www.iqeye.com/news/RCCMPEG.htm, (May 8, 2002), printed off Internet Aug. 5, 2004, 2 pgs.

IQinVision Press Release, IQinVision Launches IQeye3-W, Bringing High Resolution Video To Wireless 802.11b Networks, http://www.iqeye.com/news/IQ3W1nch.htm, (Jul. 8, 2002), printed off Internet Aug. 5, 2004, 2 pgs.

IQinVision Press Release, IQinVision Enchanes IQeye3 Smart Camera Platform, Doubling Frame Rates For Many Applications, http://www.iqeye.com/news/IQ3fps.htm, (Jul. 25, 2002), printed off Internet Aug. 5, 2004, 2 pgs.

IQinVision Press Release, Smart Network Camera With Free Recording And Playback Software Embedded In The Camera, http://www.iqeye.com/news/IQlibrarian.htm, (Sep. 22, 2003), printed off Internet Aug. 5, 2004, 2 pgs.

IQinVision Press Release, IQeye3 Megapixel Network Camera Version 2 Offers HDTV Image Support For High Resolution Surveillance And Remote Monitoring, http://www.iqeye.com/news/IQ3v2.htm, (Mar. 1, 2003), printed off Internet Aug. 5, 2004, 2 pgs.

* cited by examiner

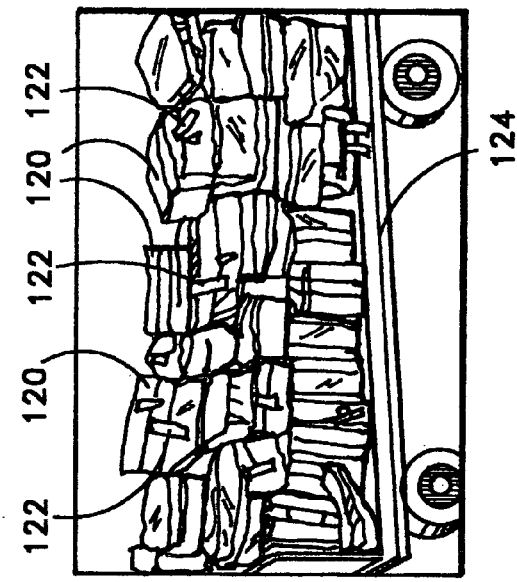
FIG. 1C
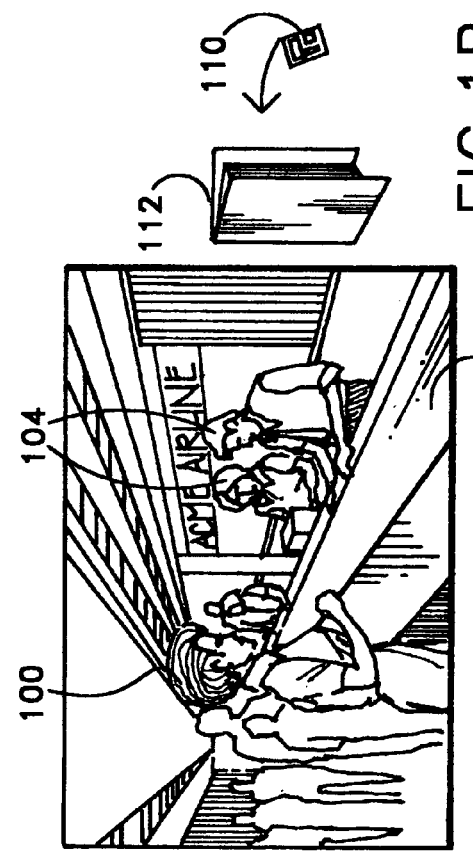
FIG. 1B
FIG. 1A

SYSTEMS AND METHODS FOR LOCATION OF OBJECTS

This patent application claims priority to copending U.S. Provisional Patent Application Ser. No. 60/437,713, filed Jan. 2, 2003, and entitled "SYSTEMS AND METHODS FOR LOCATION OF OBJECTS" by Washington, the entire disclosure of which is incorporated herein by reference.

BACKGROUND OF THE INVENTION

The present invention relates generally to systems and methods for locating objects, and in one exemplary application to asset locating systems.

Active Radio Frequency Identification ("RFID") is presently in use today to locate assets. These assets are typically critical use or expensive items that are otherwise difficult or labor intensive to locate. Examples of RFID applications include location of assets in crowded factory environments, location of shipping containers and updating the location of a shipping container as the container is moved past different fixed RFID receiver stations, and location of critical medical equipment.

Existing RFID systems typically include transceivers and a computer or PC based application. The RFID transceivers use signal strength and round trip timing to get a rough triangulation of an article tagged with a RFID tag. Once the overall system (transceivers and PC based application) has been "trained" or calibrated to "know" the relative positional relationship between transceivers then the general area where the article is located can be found in a two dimensional manner, using a floor plan of the area, such as the article is located on the west side of incoming inspection area, or the article is located at dock #3. However, only limited article location capability is provided by existing RFID systems, and the information provided by existing RFID systems is only useful when the system also has access to a floor plan of the area.

SUMMARY OF THE INVENTION

Disclosed herein are visual locating systems and methods that may be employed to visually track and/or locate objects (e.g. articles, assets, personnel, vehicles, animals, etc.) equipped with active RFID tags. The disclosed systems and methods may employ an articulated camera/s, such as closed circuit television ("CCTV") or other suitable type of articulated camera, that is equipped with an antenna array. In various embodiments of the disclosed systems and methods disclosed herein, a number of exemplary features may be advantageously implemented for object location, alone or in combination.

In various embodiments of the disclosed systems and methods disclosed herein, a number of exemplary features may be implemented, alone or in combination to achieve various advantages over existing RFID locating systems. Examples of some of the advantages of the disclosed visual-based systems and methods over existing RFID locating systems and methods include, but are not limited to the following:

1) The disclosed visual locating systems may be configured in one embodiment to be capable of determining three dimensional locations of objects. In contrast, existing RFID tracking approaches can only locate the object in two dimensions.
2) The disclosed visual locating systems may be employed in one embodiment to provide visible verification of the state or condition of a tagged object, such as article, person or animal. In contrast, existing RFID tracking techniques do not provide visible verification of the state or condition of the tagged article.
3) The disclosed visual locating systems may be employed in one embodiment to provide visible verification of the surroundings of the tagged object, whereas existing RFID techniques do not provide visible verification of the surroundings of the tagged article.
4) The disclosed visual locating systems may be configured in one embodiment for instant use or operation for location of objects without training or calibration, whereas existing RFID techniques must be "trained" or configured in order to "know" the spatial relationship between transceivers.
5) In one embodiment, implementation of the disclosed visual locating systems does not require the use of a floor plan. In contrast, existing techniques require that a floor plan be entered into the RFID locating system application so that the triangulated position may be used to determine the general location of the article in relation to the floor plan.

In one exemplary embodiment, the disclosed visual locating systems may be implemented to locate a particular active RFID tagged object within the field-of-view of one or more articulated cameras, such as closed circuit TV cameras. In this embodiment, an array of antennas and associated tracking circuitry may be placed or otherwise installed or coupled around the line of sight of the articulated camera/s. Advantageously, this configuration may be implemented to allow for location, alignment of the camera line of sight ("LOS"), and for visual observation of a tagged object without the need for resorting to triangulation from multiple RFID transceivers. For example, a visual image of the tagged object may be provided within the articulated camera field of view ("FOV") by using a differential set of antennas that receive the emissions from the active RFID tag and by determining the relationship between the camera LOS and the object location via a scanning mechanism that analyzes the emitted signals from the active RFID tag.

In another exemplary embodiment, two or more antenna-equipped cameras may be coupled together or coupled to a common node (e.g., via local area network "LAN" or any other suitable communication network) to form a wide area multi-camera visual locating system. Upon RFID tag activation, the wide area system may be interrogated to discern which of the multiple cameras are receiving the maximum signal strength from the emitting RFID tag. This information may be used to determine which camera/s should perform a location sweep pattern or scan. While scanning, the system may be configured to maintain a record of multiple pointing solutions (if more than one exists) and may, for example, present a system operator with an image associated with each solution such that the operator may select the preferable view. Placing a system operator in the decision loop advantageously provides a very robust system in terms of eliminating false positives. Thus, the disclosed systems and methods may be advantageously implemented to handle multi-path problems. This is in contrast to existing non-visual two dimensional RFID systems that also may experience such multi-path problems when a tagged article is being triangulated by multiple fixed location transceivers, but in which no mechanism exists for verifying that the article actually occupies the location indicated.

In various embodiments of the disclosed systems and methods disclosed herein, a number of exemplary object location features may be advantageously implemented, alone or in combination. Following are examples of several embodiments that employ one or more of these features to achieve one or more advantages of the disclosed systems and methods: 1) A pan-tilt-zoom ("PTZ") camera with embedded active RFID transceiver; 2) Systems and methods for linking PTZ cameras to active RFID transmissions to provide imagery of a RFID tagged object; 3) Systems and methods for providing simultaneous views of a RFID tagged object's surrounding environment and a zoomed image of the tagged object; 4) PTZ camera/s with embedded RFID antennas, receivers, and/or conditioning circuitry; 5) Mechanism/s and method/s for aligning a PTZ camera line of sight to a RFID tagged object (e.g., article, person, etc.); 6) Systems and methods for implementing an operator-in-the-loop-based object location mechanism, and for determining validity of the location of an RFID tagged object; 7) Systems and methods for initiating a RFID tag transmission from a visual tracking camera (e.g., CCTV, etc.); 8) Methods and systems for luggage and passenger tracking in an airport or similar environment via the use of RFID tags; and 9) Methods and systems for factory alignment of an antenna array with the optical line of sight, e.g., the optical line of sight of a PTZ camera attached to or otherwise integrated with the antenna ray.

In one respect, disclosed herein is a camera assembly unit including an optical block and a RF receiver, the RF receiver being configured to receive from an antenna an RF signal including a RFID broadcast transmitted by a RFID device.

In another respect, disclosed herein is a camera assembly including an optical block and at least one of an embedded RF receiver or an embedded RF antenna. Where present, the embedded RF antenna may be configured to receive a RFID broadcast transmitted by a RFID device. Where present, the embedded RF receiver may be configured to receive from a RF antenna a RF signal including a RFID broadcast transmitted by a RFID device.

In another respect, disclosed herein is a visual locating system, including a plurality of camera assemblies. Each of the camera assemblies my include an optical block and a RF receiver, with the RF receiver being configured to receive from a RF antenna one or more RF signals including a RFID broadcast transmitted by a RFID device. The system may also include a computer processor in communication with each of the plurality of camera assemblies.

In another respect, disclosed herein is a method of locating objects in a passenger terminal, including associating a first RFID device with a passenger, and locating the passenger within the passenger terminal using a RF transmission broadcast by the first RFID device. The method may also include tracking the passenger within the passenger terminal using a visual locating system that includes a plurality of camera assemblies. Each of the plurality of camera assemblies may include an optical block and a RF receiver, with the RF receiver being configured to receive from a RF antenna one or more RF signals including a RFID broadcast transmitted by the first RFID device. The system may also include a computer processor in communication with each of the plurality of camera assemblies. The method may further include associating a second RFID device with a luggage item or carry on item of the passenger, and locating the luggage item within the luggage handling areas of the passenger terminal (or locating the carry on item with the passenger terminal) using a RF transmission broadcast by the second RFID device.

In another respect, disclosed herein is a method of visually locating objects, including associating a RFID device with an object, and providing a camera assembly unit including an optical block and a RF receiver that is configured to receive from an antenna an RF signal including a RFID broadcast transmitted by the RFID device. The method may also include receiving a RFID broadcast transmitted by the RFID device and received by the RF receiver from the antenna, and visually locating the object using the optical block of the camera assembly based on the RFID broadcast received by the RF receiver from the antenna.

In another respect, disclosed herein is a method of aligning an optical block of a camera assembly with a RFID device, including providing a camera assembly unit including an optical block and a RF receiver, with the RF receiver being configured to receive from an antenna an RF signal including a RFID broadcast transmitted by the RFID device. The method may also include receiving a RFID broadcast transmitted by a RFID device and received by the RF receiver from the antenna, and aligning the optical block of the camera assembly with the RFID device based on the RFID broadcast received by the RF receiver from the antenna.

BRIEF DESCRIPTION OF THE DRAWINGS

FIG. 1A illustrates a passenger at an airport ticket counter where the disclosed systems and methods may be implemented according to one embodiment of the disclosed systems and methods.

FIG. 1B illustrates a RFID tag and associated ticket holder for tagging a passenger according to one embodiment of the disclosed systems and methods.

FIG. 1C illustrates luggage tagged with RFID tags according to one embodiment of the disclosed systems and methods.

DESCRIPTION OF ILLUSTRATIVE EMBODIMENTS

Figure 2:
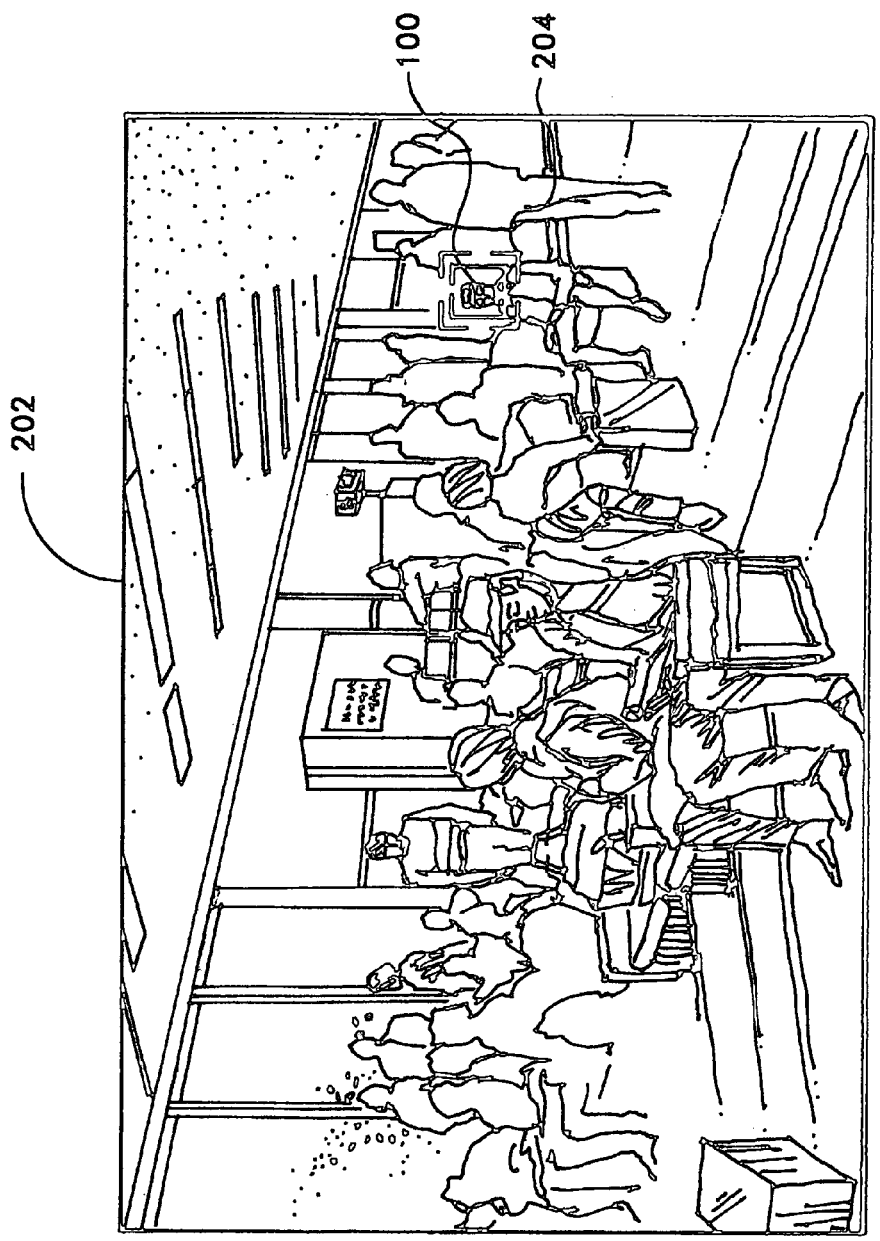
FIG. 2 illustrates a located and highlighted passenger according to one embodiment of the disclosed systems and methods.

The disclosed systems and methods may be employed to RFID and/or visually track objects in a variety of different application environments, for example, in asset tracking applications. Other example environments in which the disclosed locating systems and methods may be implemented include, but are not limited to, tracking of personnel or other individuals. For example, one specific case is tracking passengers through an airport (or other passenger processing facility such as train station, passenger dock, etc.) in an exemplary manner as described below.

FIG. 1A illustrates a passenger 100 during the check-in process at an airport ticket counter 102. During such a check-in process, passenger 100 may receive ticket/boarding documents for a flight, and/or may optionally check luggage for the flight. Although FIG. 1A illustrates ticket counter personnel 104 assisting passenger 102 with ticket/boarding documents, it will be understood that the disclosed systems and methods may also be implemented with automatic or un-manned check-in systems in which ticket/boarding documents are automatically dispensed to passenger 102, and/or luggage is automatically checked.

As shown in the exemplary embodiment of FIG. 1B, during passenger check-in at the ticket counter or at any other suitable station (e.g., at the airport entrance, at a security check-point, at the gate, etc.) a RFID tag or other suitable form of RFID device 110 may be placed in a RFID carrier such as a ticket holder 112 that is given to passenger 102 and that is to remain with passenger 102 at least until passenger 102 boards an aircraft (or other passenger vehicle such as train, ship, etc.). Alternatively, a RFID tag 110 may be placed in any other suitable form of RFID carrier (e.g., document, badge, etc.) that is given or assigned to passenger, or may be attached (e.g., permanently or in inseparable fashion) to the passenger's ticket itself. Furthermore, rather than placing a RFID into a ticket holder during the check-in process, it is also possible that a RFID tag may be present as an integrated or pre-existing part of a RFID carrier, e.g., RFID that is manufactured into a ticket holder jacket or ticket itself. In a further embodiment of the disclosed systems and methods illustrated in FIG. 1C, a passenger's checked luggage 120 may also be tagged with an RFID 110 that is attached to or contained within any suitable form of RFID carrier 122. As illustrated in FIG. 1C, RFID carrier 122 may be configured to remain with luggage 120 (e.g., shown here as being transported on baggage cart 124) throughout the baggage handling process from origin to destination.

Once a passenger 100 and/or luggage 120 are tagged with RFID tags 110, they may be tracked throughout an airport, for example, using any method or system that is suitable for tracking the location of RFID tags 110. Such methods and systems include, but are not limited to, embodiments of RFID tracking methods and systems as described further herein. For example, one or more RFID detectors (e.g., in the form of RFID receivers and/or transceivers) may be configured (with or without associated cameras) to determine and/or track the location of individual RFID tags 110 throughout an airport. In one embodiment, RFID detectors (configured with or without associated cameras) distributed at locations throughout an airport (e.g., at fixed locations in different rooms and/or at fixed locations to cover different areas of the airport) may be employed to follow the location of a passenger based on receipt of RFID signals from the passenger's RFID tag 110 by the different RFID detectors as the passenger moves from the vicinity of one RFID detector to another. In such an implementation, a location history may be generated that records the passenger's movements between rooms or areas of the airport.

In another embodiment, a passenger at an unknown location within the airport may be located in real time by searching the airport with RFID transmissions. In this regard, multiple RFID transmitters or transceivers located throughout the airport may transmit RFID tag activation data, and a passenger may be located in real time based on receipt of RFID signals from the passenger's RFID tag 110 by one or more RFID detectors (configured with or without associated cameras). Combinations of one or more such RFID location methods with visual tracking methods described further herein are also possible. Combinations of visual and non-visual RFID location methods are also possible. In this regard, non-visual (non-camera equipped) RFID detectors may be employed to locate or follow the location of a passenger within the airport under normal circumstances, and visual (camera equipped) RFID detectors employed to visually track or obtain an image of the passenger only when specifically needed.

In the practice of the disclosed systems and methods, a passenger 100 and/or luggage 120 may be tracked throughout all or any given portion of the air transportation system using the RFID tags 110. In this regard, an airport-wide locating system may be implemented to track a passenger 100 from check-in point to gate, and/or to track luggage 120 from check-in point to an aircraft. Alternatively, using a multiple-airport locating system may be implemented to track a passenger 100 from check-in point at an origin airport to a selected arrival point at a destination airport (e.g., the gate, the luggage claim area, an exit portal from the airport, etc.). Similarly, a multiple-airport locating system may be implemented to track luggage 120 from check-in point at an origin airport to a selected arrival point at a destination airport (e.g., including in any of the luggage handling areas of the airport, the luggage claim area of the airport, an exit portal from the airport, etc.).

Location of a given RFID tag 110 may be communicated from a given RFID detector to one or more RFID tracking computer processor/s using any suitable hardwire or wireless technology. A RFID tracking computer processor may in turn track and/or process the current location and location history of a given passenger or luggage RFID tag 110 in any suitable manner including, but not limited to, by storing the information in memory, displaying real time location or location history of each passenger luggage on an operator display, selectively displaying on an operator display the real time location or location history of specific passenger/s or luggage that have been selected for heightened monitoring, processing the location information to determine if a given passenger or luggage has entered an area that is unauthorized for the given passenger or luggage and initiating display of this information or an alarm, combinations of the preceding, etc.

It will be understood that a multiple airport locating system may be implemented using geographically remote RFID tracking computer sub-systems located at different airports, and that any network or other type of communication system may be employed that is suitable for interlinking geographically remote computer sub-systems. Furthermore, an RFID locating system may also be optionally implemented to track passenger 100 and/or luggage 120 while on an aircraft using RFID tracking mechanisms and tracking computer subsystem/s installed on the aircraft. In such an exemplary embodiment, communication with ground-based computer components of an RFID locating system may be accomplished using any aircraft-based communication equipment suitable for computer network communications, e.g., such as may be already installed on the aircraft. In yet another exemplary embodiment, portable RFID tracking subsystems may be employed to allow "spot checks" of passengers 120 and/or luggage 120 boarded on an aircraft sitting on the ground, or at any other location not accessible by an existing RFID tracking subsystem. In such an exemplary embodiment, a portable RFID tracking subsystem may be configured to communication with an RFID tracking computer system using any suitable methodology, e.g., using wireless computer networking technology, using hardware connector provided at a Jetbridge console or other suitable location, etc.).

In one exemplary embodiment, RFID tags 110 associated with a passenger 100 and their respective luggage 120 may be linked in a RFID tracking computer system that tracks the RFID tags 110. Such an implementation may be employed, for example, to monitor the location of a given passenger 100 relative to luggage 120 that is associated with the given passenger 120, e.g., to verify that the passenger 100 travels on the same aircraft as does any luggage 120 checked by the passenger 120. In such a case, a RFID tracking computer system may be configured to automatically detect or recognize that a given passenger 100 has been separated from their associated luggage 120, e.g., a passenger 100 has not boarded the same aircraft into which their associated luggage 120 has been loaded. In another exemplary embodiment, a passenger's carry on items may also be tagged with respective RFID tags 110 and linked to the RFID tag 110 associated with the passenger in a RFID tracking computer system. Such an implementation may be employed, for example, to monitor the location of a given passenger 100 relative to carry on item/s that are associated with the given passenger 120, e.g., to verify that the passenger 100 maintains the carry on item/s in their possession. In such a case, a RFID tracking computer system may be configured to automatically detect or recognize that a given passenger 100 has been separated from their carry on item/s, e.g., a passenger 100 has left the carry on item/s unattended somewhere within the airport. This may be done, for example, by locating said carry on item within said passenger terminal using a RF transmission broadcast by said first RFID device, and detecting when the location of the passenger differs from the location of the carry on luggage by a predetermined distance and/or for a predetermined length of time.

In a further embodiment, RFID passenger and/or luggage tracking information may be integrated with operational information, for example, so that legitimate reasons for separation of a given passenger 100 with their associate luggage 120 may be identified. Such legitimate reasons may include, for example, failure of a passenger 100 to make a connection between two different flights, volunteering by a passenger 100 to accept a voucher to miss an overbooked flight, etc. In one exemplary implementation of such an embodiment, a RFID tracking computer system may be in communication with airport and/or airline-maintained operational computer systems that track airline flight status information (e.g., flight cancellations, flight arrival and departure times, aircraft maintenance delays, changes in specific aircraft used for a given flight, overbooked flights, aircraft standby lists, lists of passengers 100 that volunteer for vouchers on overbooked flights, etc.) to help identify legitimate reasons for passenger/luggage separation.

In yet another exemplary embodiment, a passenger 100 may be photographed (e.g., under suitable lighting conditions for the photographic equipment employed) while at the ticket counter or at any other suitable station in the airport, for example, for facial recognition purposes and for verification at the gate. In this regard, a passenger 100 may be so photographed in addition to (and optionally at the same time as) being assigned or tagged with an RFID tag 110. In one exemplary implementation of such an embodiment, a gate or other security station may be equipped with both a RFID reader (e.g., RFID receiver or transceiver) for reading the passenger's RFID tag 110, and a display (e.g., LCD, CRT, etc.) linked to a central computer of a RFID computer locating system for displaying a passenger's photograph. The RFID computer locating system may then be so configured to automatically display to a gate attendant the photograph of a given passenger 100 when the RFID tag associated with that given passenger is read at the gate (e.g., presented at the gate kiosk during passenger boarding). Display of a passenger's photograph at the gate may be advantageously implemented as an alternative to requiring the passenger to re-present identification at the gate kiosk.

It will be understood that the disclosed systems and methods may be implemented using any type of RFID device technology having a range suitable for detection by one or more RFID detectors/RFID antenna apparatus of a given apparatus or system. In this regard, a RFID device may be configured to transmit a RFID broadcast response in response to an external stimulus received by the RFID device (e.g., such as RFID activation data transmitted by an RFID transmitter or transceiver), and/or may be configured to autonomously transmit a RFID broadcast (e.g., to transmit a RFID broadcast periodically or on a continuous basis). Thus, it will be understood that the methods and systems described herein as employing RFID devices that respond to RFID activation data with an RFID response broadcast are exemplary only, and that autonomously-transmitting RFID devices may also be suitably employed in the same methods to transmit a RFID broadcast for reception by one or more RFID detectors without the need for RFID activation data transmitted by an RFID transmitter or transceiver. It will also be understood that autonomously-transmitting RFID devices may also be employed in combination with RFID activation data where RFID devices that respond to transmitted RFID activation data are also present in a system, or where the autonomously-transmitting RFID devices are also configured to respond to transmitted RFID activation data.

In this regard, a RFID tag 110 may be a re-useable RFID tag, or may be a disposable (or one-use-only) RFID tag. For example, a particular re-useable RFID tag 110 may be activated and associated with a given passenger 100 at the ticket counter or other suitable stations and then used to track the passenger throughout the airport until the passengers boards an aircraft. When a re-useable RFID tag 110 is scanned at the gate kiosk the associated passenger 100 may be noted by the RFID tracking computer system as boarding the plane, and the RFID tag 110 may be automatically deactivated or disassociated with the passenger 100. Further, as this passenger boards the aircraft at the gate, the gate attendant may recover the re-useable RFID tag 110 from the passenger 100 (e.g., by taking the RFID tag 110 from the RFID container). Where a ticket holder is employed as a RFID container for a re-useable RFID tag 110, the gate attendant may remove the paper ticket from the ticket holder, give the paper ticket back to the passenger, and send the ticket holder with re-useable RFID tag 110 back to the ticket counter or other suitable station for reuse. Alternatively, a particular re-useable RFID tag 110 may remain with a given passenger 100 for the duration of the passenger's flight itinerary, and then removed and deactivated when the passenger 100 reaches their final destination. In a similar manner, a particular re-useable RFID tag 110 that has been associated with a given piece of luggage 120 may be removed as the luggage is either placed on the plane at the origin airport or as it is taken from the plane, or removed from the airport at the final destination. In any case, the reusable RFID tag 110 may be deactivated or disassociated from the given piece of luggage 120 and reused. A similar methodology may be employed for disposable RFID tags, with the exception that there is no need to recover a disposable RFID tag 110 upon deactivation or disassociation with a given passenger 100 or piece of luggage 120.

In another exemplary embodiment illustrated in FIG. 2, the disclosed locating systems and methods may be employed to visually locate a particular passenger 100 in a cameral display 202 of an airport environment, e.g., among a large number of other passengers in a crowded airport terminal. Such an embodiment may be implemented using a RFID locating system that employs pan-tilt-zoom (PTZ) cameras equipped with RFID antenna array, e.g., such as a RFID locating system described and illustrated with respect to FIGS. 3–10 herein. Such cameras may be operatively configured at multiple locations within an airport and coupled to a RFID locating system so as to provide the system with a combined visual field of view that covers substantially all areas of an airport, or that covers selected areas of an airport (e.g., ticket counter, security checkpoint, gate area, baggage claim area, etc.).

If at any time a given passenger 100 needs to be visually located, information from the RFID tag 110 associated with the given passenger 100 may be used to identify which PTZ camera has the given passenger 100 within its field of view. Where continuous RFID tracking is employed, this information may be retrieved from the location history maintained in system memory for the given passenger 100. Otherwise, the antenna arrays of the system PTZ cameras so equipped may be activated to locate the particular RFID tag 110 associated with the given passenger 100. In either case, an appropriate PTZ camera having the given passenger 100 within its field of view may be identified and a display 202 generated (e.g., for an operator) that shows the area within which the given passenger 100 is located. The operator may then manually direct the PTZ camera in such a way as to zoom-in and focus on the given passenger 100, and/or the PTZ camera may automatically zoom-in and focus on the given passenger 100 using its RFID antenna arrays and the transmissions of the particular RFID tag 110 associated with the given passenger 100, for example, in a manner as described further in relation to FIGS. 3–10 herein.

In those embodiments where a given passenger 100 has been digitally photographed (e.g., at the ticket counter or other suitable station), then face recognition methodology may be used to further locate or pinpoint (e.g., highlight) the passenger 100 within the display area 202 (as indicated by the highlighted box 204 in FIG. 2) prior to zooming in on the passenger 100, i.e., assuming that the camera has a view of the given passenger's face. As previously described herein, if carry on luggage is also tagged then the relationship between the passenger and their luggage may be discerned at any time. These are just a few of the exemplary tasks, and combinations thereof, that may be performed using the disclosed visual locating systems and methods.

Figure 3:
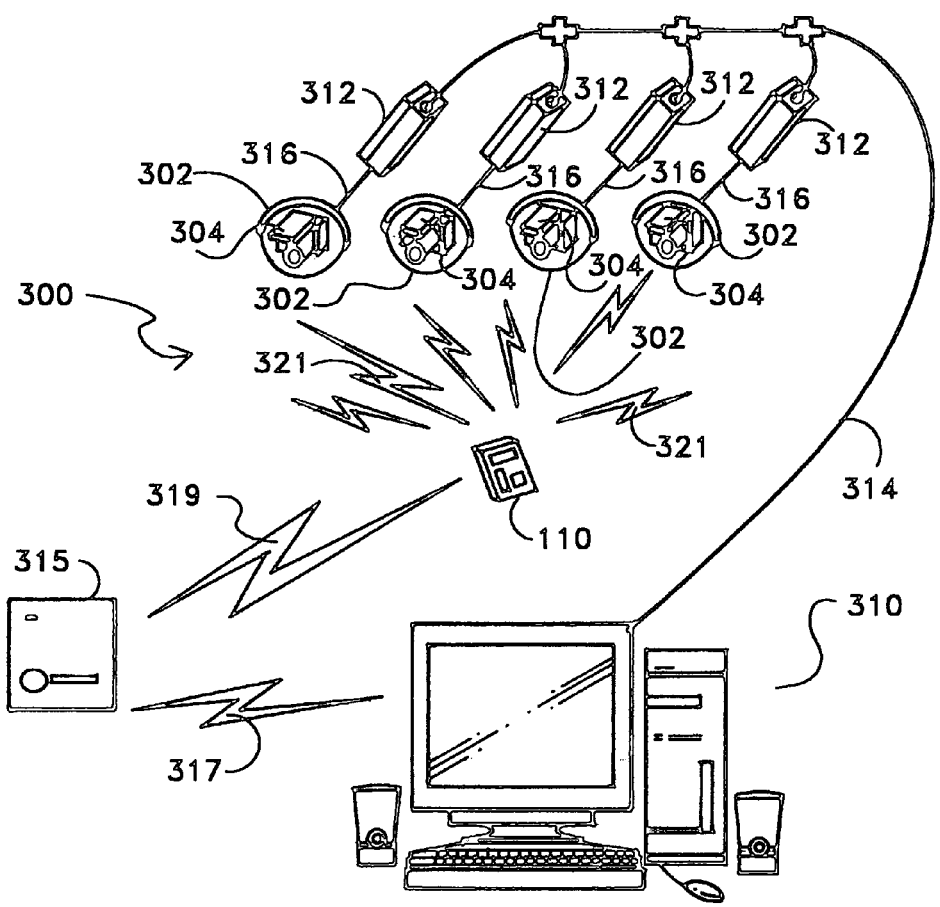
FIG. 3 is a simplified illustration of a visual locating system configuration according to one embodiment of the disclosed systems and methods.

FIG. 3 illustrates one exemplary embodiment of a wide area multi-camera visual locating system 300 having multiple visual tracking PTZ television camera assemblies 302 (shown in FIG. 3 to be configured with optional dome enclosures), which may be configured with differential antenna arrays in a manner as described elsewhere herein. In the embodiment of FIG. 3, multiple camera assemblies 302 are shown communicatively coupled together and communicatively coupled to a computer processor 310 via hardwire 314 (e.g., a local area network "LAN" or any other suitable hardwire communication method) to form the wide area multi-camera visual locating system. It will be understood that in other embodiments multiple camera assemblies 302 may be communicatively coupled together and/or communicatively coupled to a computer processor 310 via wireless communication methods (e.g., wireless network, etc.).

Although exemplary PTZ television cameras are described and illustrated herein, it will be understood that benefits of the disclosed systems and methods may be realized using any camera configuration suitable for providing a suitable field of view and/or suitable visual representation of the viewed area that is desired or needed for a given application. Examples of types of cameras that may be employed include, but are not limited to, non-articulated cameras, cameras that are articulated in only one plane, cameras that may be articulated in multiple planes, etc. Furthermore, one or more cameras for generating any type of visual representation of a given area that is suitable for the needs of a given application may be may be employed including, but not limited to, infra-red cameras, thermal imaging cameras, radiation imaging cameras, etc. It will also be understood that any desired number of one or more cameras (e.g., a single camera, more than four cameras, less than four cameras, etc.) may be employed, and that multiple cameras may be selectively positioned in remote relationship to each other (e.g., to provide views of different rooms, to provide views of different areas of the same room, to provide views of both inside and outside areas of a building, etc.)

FIG. 3 also illustrates other exemplary components that may be employed as part of a visual locating system 300. As shown, these components may include one or more computer processors 310 (e.g., PC or other suitable computing device) that may be communicatively coupled to a network of PTZ television camera assemblies 302 via hardwire 314 (as shown) or by any other suitable method, e.g., wireless interconnect. In the illustrated exemplary embodiment, RFID receivers 304 may be configured as a part of each respective PTZ television camera assembly 302 having a differential antenna array. Also shown in FIG. 3 are optional image processing and camera control units 312 that may be coupled between computer processor/s 310 and each PTZ television camera assembly 302 via hardwire 316 (or alternately by wireless link). In this regard, optional image processing and camera control units 312 may include digital signal processing ("DSP") circuitry, hard drive, etc. that may be present to perform image processing and/or camera control tasks). However, it will be understood that computer processor/s 310 may be directly coupled to camera assemblies 302 without the presence of optional image processing and camera control units 312 therebetween.

Still referring to FIG. 3, one or more stationary wide area RFID transceivers 315 (e.g., of the type available from Active Wave, Inc. of Boca Raton, Fla. or other suitable supplier) may be located throughout an area of concern (e.g., in different rooms of building, in different areas of a room, etc.) in any pattern suitable for achieving communication coverage as desired or needed for a given application. In this regard, stationary wide area RFID transceivers 315 may be pre-existing components of a conventional RFID installation, or may be installed contemporaneously with other components of the disclosed systems and methods. Computer processor/s 310 may be communicatively coupled to stationary wide area RFID transceivers 315 via wireless communication link 317 as shown, or by any other suitable method, e.g., by hardwire. In this regard, a computer processor 310 may be coupled to one or more local or remote transmitters and/or antenna elements suitably configured for communicating with one or more stationary wide area RFID transceivers 315 to fit the needs or requirements of a given application. In one exemplary embodiment, computer processor/s 310 may be configured with transmitters and antenna elements that are arranged or configured in such a way as to cover a narrow or smaller RF transmission area than a larger RF transmission area covered by stationary wide area RFID transceivers 315, but at the same time so that all stationary wide area RFID transceivers 315 are in communication with the system via the transmitters of computer processor/s 310.

In one exemplary embodiment, a given RFID tag 110 of FIG. 3 may be located as follows. A query in the form of RFID tag activation data (e.g., RFID key number or other suitable tag identifier information) corresponding to the given RFID tag 110 may be entered into computer processor 310 (e.g., manually entered query, automatic query entered by another computer system or computer processor coupled to computer processor 310, etc.). Computer processor 310 may then wirelessly transmit at a first frequency interrogation data in the form of the RFID tag activation data to each of stationary wide area RFID transceivers 315 via wireless link 317. Stationary wide area RFID transceivers 315 may then rebroadcast the interrogation data over a larger area via wireless communication link 319 on a second and different frequency (that is receivable by RFID tags 110) from the first frequency. In response to the tag activation data of the interrogation data received from one or more of stationary wide area RFID transceivers 315, only one given RFID tag 110 within the radio frequency (RF) transmission range of the stationary wide area RFID transceivers 315 will respond and send out an acknowledge broadcast 321 that may be received by one or more of RFID receivers 304 (e.g., via differential antenna arrays of camera assemblies 302).

In a manner that will be described further herein, a broadcast response received from a given RFID tag 110 may be received by one or more of antenna-equipped PTZ camera assemblies 302 that may in turn communicate RFID tag response information (e.g., responding RFID tag ID, signal strength of RFID response, etc.) to computer processor 310 via hardwire components 316, 312, 314 (or alternately by wireless link). Based on this RFID tag response information, computer processor 310 may recognize that a particular RFID tag 110 has responded and may optionally take further action to locate or further define the location of the responding RFID tag 110 by further processing the RFID tag response information. For example, computer processor 310 may optionally verify that each response was received from the desired RFID tag 110 and/or may select one or more camera assemblies 302 that received the strongest RFID response signals from tag 110 for further visual scanning action. Computer processor may then communicate scanning commands to the selected camera assemblies via hardwire components 316, 312, 314 (or alternately by wireless link). Each of the selected camera assemblies 302 may then scan an area based on the location of the response received by the respective camera assembly 302 from the given RFID tag 110.

Visual scanning information from each of the selected camera assemblies 302 may then be communicated back to computer processor 310 via hardwire components 316, 312, 314 (or alternately by wireless link), which may simply display the results to an operator, or which may further process the visual scanning results and/or take further action based thereupon. For example, computer processor 310 may evaluate the quality of the visual scanning results received from each selected camera assembly 302, e.g., based on one or more factors such as RFID signal strength, RFID signal quality, etc. In this regard, RFID signal quality may be evaluated, for example, using a checksum method to verify quality of the RFID signal versus random noise. Computer processor 310 may then select images from one or more of selected camera assemblies 302 for viewing, and/or may communicate additional scanning commands to one or more camera assemblies 302 (e.g., wider or narrow scan areas, re-scan with camera lens zoomed in or out, etc.). In this regard, computer processor 310 may be optionally configured to communicate with camera assemblies 302 so as to interactively repeat and refine visual scans prior to display to an operator.

Figure 4:
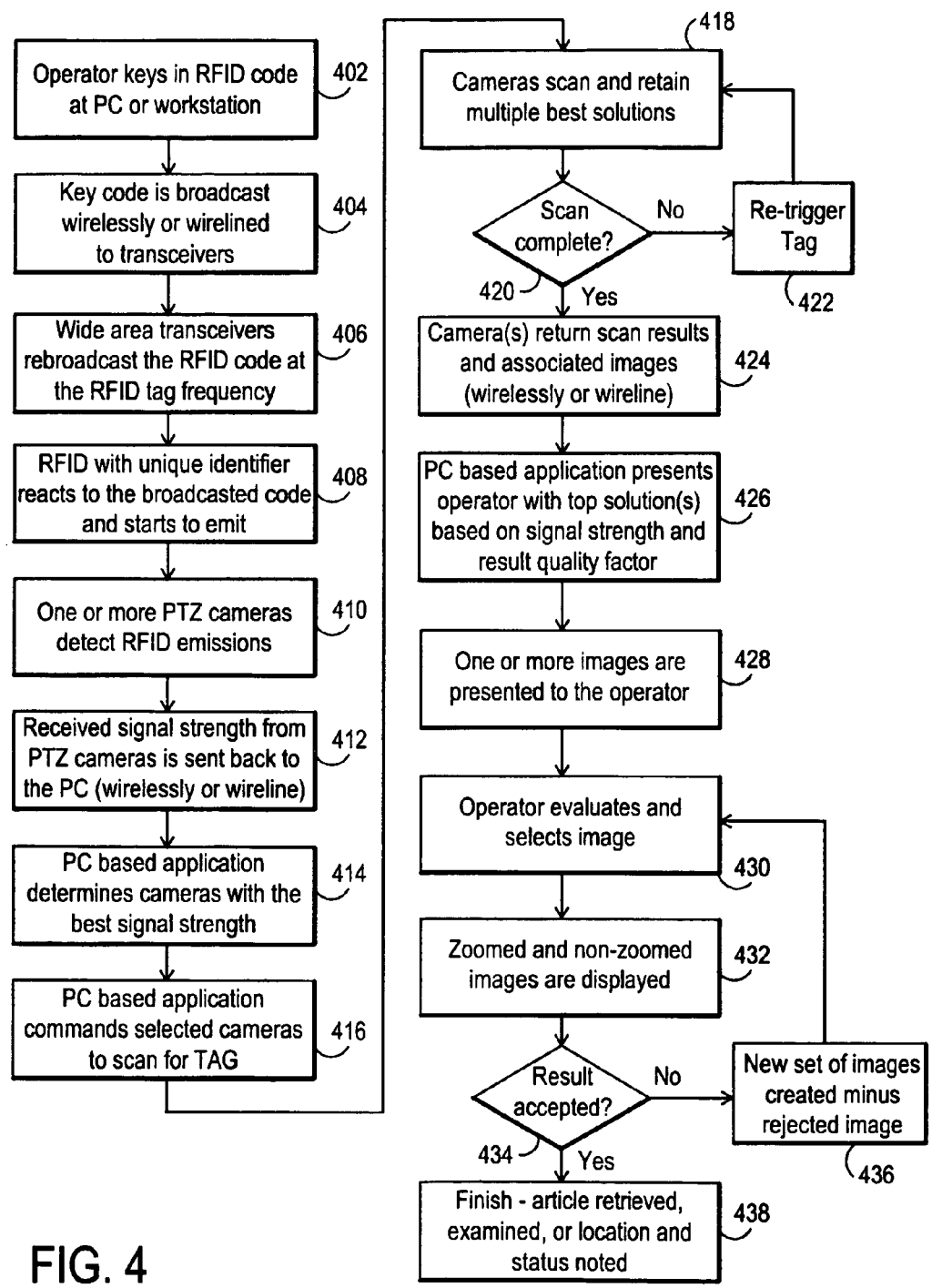
FIG. 4 is a flowchart of a method for visual tracking according to one embodiment of the disclosed systems and methods.

FIG. 4 depicts a flow chart showing one exemplary embodiment of a method of using the visual locating system 300 of FIG. 3 to locate an RFID-tagged object and to display view/s of the object to a system operator. At step 402, an operator keys in RFID tag identifier information (e.g., RFID key code) at computer processor 310, which may be a PC or PC work station. At step 404, the RFID identifier code is then communicated wirelessly or via hardwire to stationary wide area RFID transceivers 315. At step 406, stationary wide area RFID transceivers 315 re-broadcast the RFID identifier information at a frequency receivable by the RFID tags 110 of the system 300, and at step 408 the particular RFID tag 110 that corresponds to the transmitted RFID identifier information reacts to the identifier information by emitting a signal/s at the RFID frequency. At step 410, one or more of the RFID receivers 304 of camera assemblies 302 detect and receive the signal/s emitted by the particular RFID tag 110. At step 412, the signal strength of the RFID tag signals received by each camera assembly is then communicated back to computer processor 310 via hardwire components 316, 312, 314 (or alternately by wireless link). A software application running on computer processor 310 processes the signal strength information at step 414 to determine and select the camera assembly or camera assemblies 302 receiving the strongest RFID response signals (e.g., those camera assemblies 302 receiving a signal exceeding a particular pre-defined signal strength value), and at step 416 communicates scan commands via hardwire components 316, 312, 314 (or alternately by wireless link) back to the camera assemblies 302 selected in step 414.

At step 418, each of the camera assemblies 302 that were selected in step 414 respond to the scan commands issued by computer processor 310 by scanning (i.e., panning and tilting) through their full range of motion while receiving RFID response signal emissions from the particular RFID tag 110 that was activated by the previous transmission of RFID identifier information in step 406. Each selected camera assembly 302 employs a differential antenna array and signal processing to choose one or more best camera position solutions that are likely to correspond to a camera position at which the camera LOS is substantially aligned with the responding RFID tag 110. For each best camera position solution, each camera assembly 302 retains in memory visual image data corresponding to that position.

At step 420, each camera assembly 302 evaluates whether scanning operations have completed prior to cessation of broadcast by a responding RFID tag 110. If a responding RFID tag 110 has ceased transmission prior to completion of the scan, then the RFID identifier code of the particular RFID tag 110 may be rebroadcast by stationary wide area RFID transceivers 315 (e.g., rebroadcast of RFID identifier code may be coordinated by computer processor 310 upon receipt of information concerning lack of complete scan from one or more camera assemblies 302). In yet another alternatively embodiment, computer processor 310 may evaluate whether scanning operations have been completed by all of the selected camera assemblies 302 prior to cessation of broadcast by a responding RFID tag 110 (e.g., by tracking status of scanning responses received from the selected camera assemblies 302), and may trigger rebroadcast of RFID identifier code in the event it determines that scanning operations have not been so completed.

When each camera assembly 302 that was selected in step 414 determines in step 420 that its scanning operations have been completed, it communicates in step 424 the scan results (e.g., signal strength versus camera position, number and relative signal strength experienced during each scan, etc.) and visual image data associated with the scan results that has been stored in memory to computer processor 310. In step 426, computer software running on computer processor 310 selects the top scanning solution/s based on signal strength (e.g., comparison of signal strength to a minimum signal strength threshold) and optional result factor/s (e.g., signal quality). The selected top scanning solution/s that meet signal strength and result quality factor criteria are then communicated to an operator. One or more visual images associated with the selected top scanning solutions are also communicated to an operator via suitable visual display in step 428.

Figure 9:
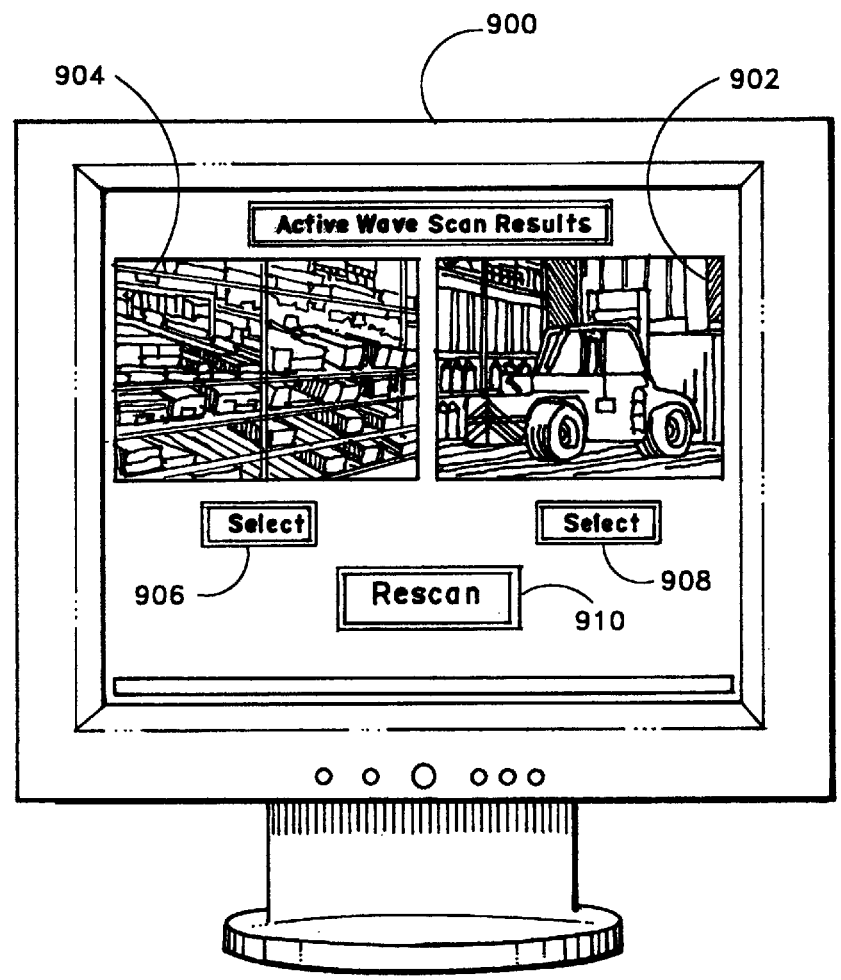
FIG. 9 illustrates an operator selection screen display according to one embodiment of the disclosed systems and methods.

In step 430, an operator may select a visual image (e.g., from a set of visual images corresponding to the selected top scanning solutions of step 428) for further display by, for example, input to a graphical user interface (GUI) such as described further herein in relation to FIG. 9, or by other suitable methodology. In response to the operator selection, computer processor 310 may display zoomed and non-zoomed versions of a selected visual image in step 432, for example, using methodology described further herein in relation to FIG. 5. If the selected image is acceptable to the operator (e.g., selected image corresponds to the desired RFID-tagged object being sought), then the operator may accept the result in step 434, and subsequent action taken as appropriate in step 438 (e.g., retrieve object, further examine the object, status and/or location of the object noted, etc.). However, if the selected image is not acceptable to the operator (e.g. selected image is indeterminate or does not correspond to the desired RFID-tagged object being sought), then the operator may reject the result in step 434, in which case a new set of visual images is displayed in step 436 that corresponds to the selected top scanning solutions of step 428 minus the rejected visual image of step 434. At this point, the operator repeats step 430 by selecting a visual image from the new set of top scanning solutions of step 436, and steps 432, 434, 436 and 430 are repeated as necessary until step 438 is reached.

It will be understood that the exemplary embodiments of FIGS. 3 and 4 represent just one example visual locating system topology and method of use thereof that may be employed in the practice of the disclosed systems and methods. It will be understood that a PC or other suitable computer processor 310 may be hardwired to one or more stationary wide area RFID transceivers 315, or computer processor 310 may be in wireless communication with stationary wide area RFID transceivers 315 using a separate computer processor base station transceiver (not shown). It will also be understood that any electronic communication protocol/s suitable for accomplishing communication between the separate components of a visual locating system may be employed.

In an another embodiment, RFID transceivers may be embedded in a camera assembly, such as camera assemblies 302 of FIG. 3, in addition to or as an alternative to stationary wide area RFID transceivers 315. In such an embodiment, an RFID tag interrogation process by a transceiver embedded in a camera assembly may be initiated via a network connection, e.g., via a LAN connection coupled between LAN based camera assemblies 302 such as hardwire components 316, 312, 314 (or alternately by wireless link). In a LAN-based camera assembly network embodiment, transceiver power may be obtained from the camera power supply. When so employed, transceivers embedded in the visual tracking PTZ cameras 302 offer the advantage of simplifying the installation effort, e.g., by eliminating the need to install separate transceivers (e.g., stationary wide area RFID transceivers 315) into the walls or other parts of a building and to provide power to the same via batteries or separate power supply lines. Thus, as used herein with reference to a camera assembly having one or more embedded devices (e.g., receiver, transceiver, antenna element, antenna array, signal processing circuitry, digital signal processor, etc.), it will be understood that the term "embedded" means that the given device/s are physically coupled to other components of the camera assembly so as to form a camera assembly unit or module that contains the given device/s.

In yet another embodiment, one or more computer processors may be communicatively coupled to a network of first stage transceivers via hardwire or by any other suitable method, e.g., wireless interconnect that may communicate with embedded second stage transceivers that are configured as a part of PTZ television camera assemblies having differential antenna arrays. The network of first stage transceivers may be located in any pattern suitable for achieving communication coverage with the embedded second stage transceivers of the PTZ television camera assemblies as desired or needed for a given application. In one exemplary embodiment, the first stage transceivers may be arranged or configured as a network of intermediate transceivers in such a way as to cover a narrow or smaller area than a wide or larger area covered by the network of second stage transceivers, but at the same time so that all second stage transceivers are in communication with the system via the network of intermediate first stage transceivers.

Whether communicated via hardwire or wireless communication link, a query in the form of RFID tag activation data may be entered into the computer processor, which then may then communicate interrogation data in the form of the RFID tag activation data to the camera assemblies. Embedded RFID transceivers in the camera assemblies may then rebroadcast the interrogation data, e.g., via differential antenna arrays mounted on the camera assemblies. In response to the tag activation data received from one or more of the embedded RFID transceivers, only one given RFID tag within the radio frequency (RF) transmission range of the network of camera assemblies will respond and send out an acknowledge broadcast that may be received by one or more of the embedded RFID transceivers (e.g., via differential antenna arrays of the camera assemblies), and in turn communicated as RFID tag response information (e.g., responding RFID tag ID, signal strength of RFID response, etc.) to the computer processor via RF broadcast or hardwire depending on the network configuration. Further processing (e.g., refining the location of the responding RFID tag, further RFID scanning, visual scanning, display of visual scanning results, etc.) may be performed as previously described in relation to FIGS. 3 and 4.

Figure 5:
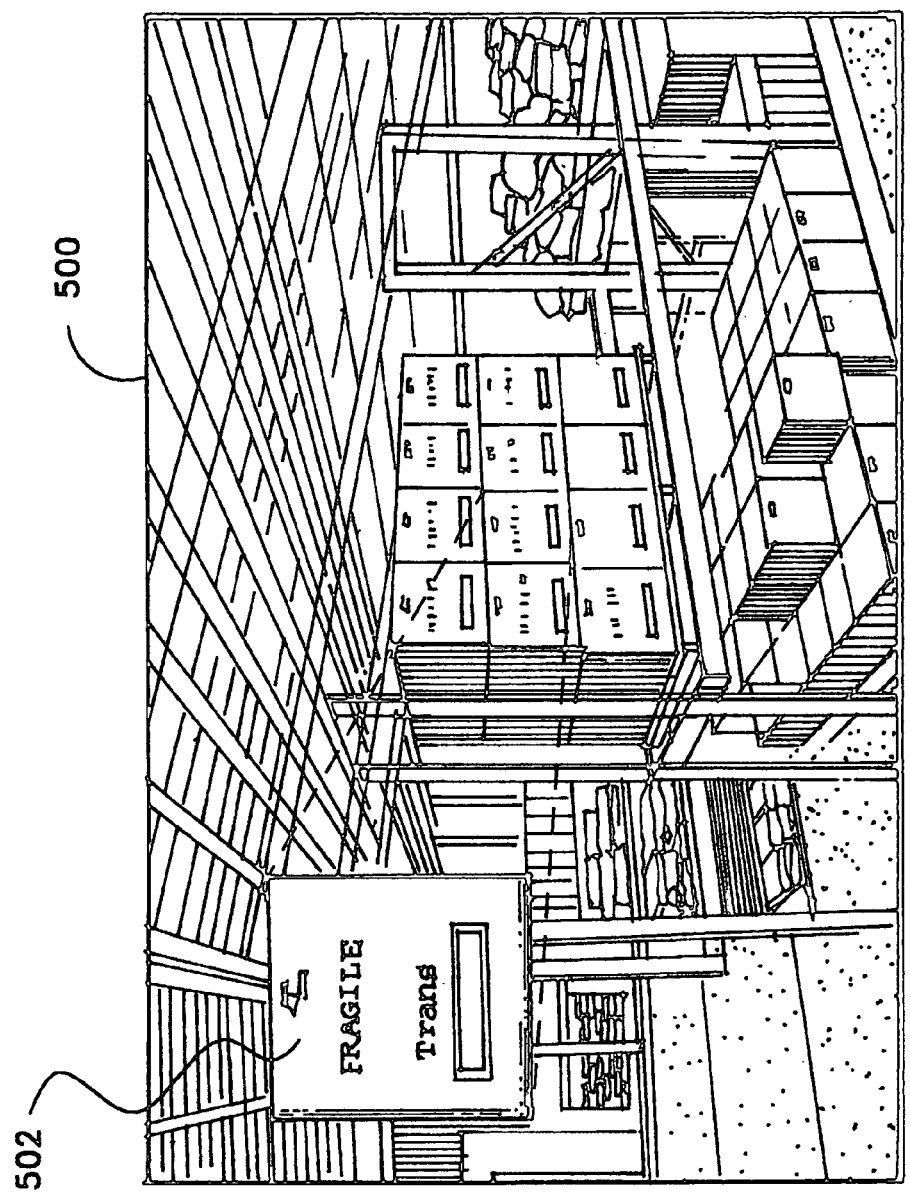
FIG. 5 illustrates display of an RFID tagged article according to one embodiment of the disclosed systems and methods.

In one exemplary embodiment, an object may be located using the disclosed methods and systems for visual tracking, and as shown in FIG. 5, both the object's surroundings 500 and a digitally zoomed image 502 of the object may be simultaneously displayed (e.g., on a single display using window-in-window views, or on separate displays). Such an embodiment may be advantageously implemented, for example, by configuring visual tracking camera assemblies 312 of FIG. 3 with high resolution digital PTZ cameras. The dual view display may be advantageously employed (e.g., in steps 432 and/or 438 of the embodiment of FIG. 4, or in other alternate embodiments) to allow for verification of the condition of the displayed object, while at the same time allowing for a full description or depiction of where the object is. Maintaining the overall view of the object's surroundings allows for a system operator to guide a fellow worker (e.g., via cell phone, walkie-talkie, etc.) to the exact location efficiently. Alternatively or additionally, each camera view (whether a single view of the object or dual view of the object and its surroundings) may be labeled with the identity of the camera (and/or the area being displayed) to assist the operator in identifying the location of the object.

As previously described, training or calibration of the disclosed visual locating systems is not required. However, training or calibration may be optionally used to further enhance the system accuracy and reduce the number of preliminary views presented to an operator, e.g., via triangulation of the object based on delay calculations on the received tag transmission, or other suitable method.

Figure 6:
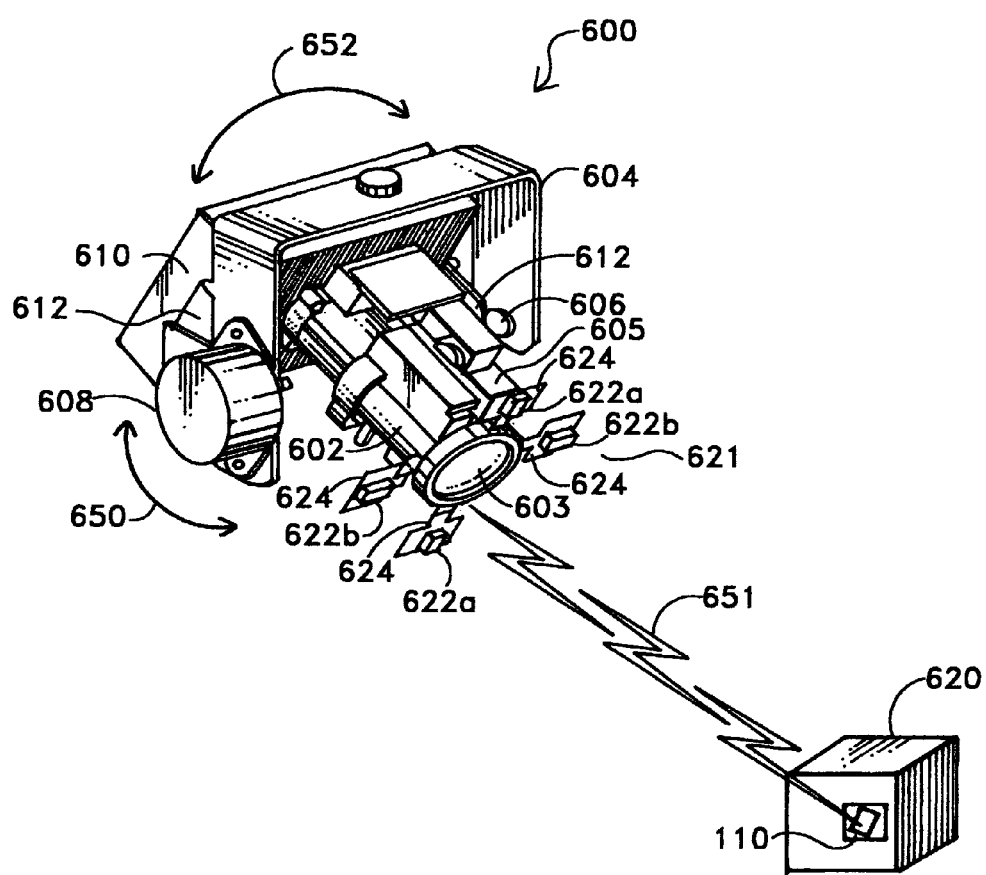
FIG. 6 illustrates a camera assembly and RFID-tagged object according to one embodiment of the disclosed systems and methods.

FIG. 6 illustrates one exemplary embodiment of a PTZ camera assembly 600 as it may be implemented to track and/or locate an object 620 having a RFID tag 110 attached thereto. As illustrated in FIG. 6, PTZ camera assembly 600 includes camera assembly base member 610 that is coupled to camera support member or yoke 604 by camera assembly base brackets 612. Camera support member 604 is in turn coupled to camera optics or optical block 602 in the manner shown so as to provide a pivot point 606 for optical block 602 and so that light or image-gathering lens 603 of optical block 602 is disposed in position to receive an image of object 620. Camera optical block 602 may include any combination of optical components (e.g., lenses, focus and/or zoom drive mechanisms, prisms and/or mirrors, etc.) and electronic components (e.g., image sensor/s) that is suitable for capturing a visual image (e.g., photographic or video image, infra-red image, thermal image, radiation image, etc.) in electronic form.

As shown, camera support member 604 may be rotatably mounted to base brackets 612 so that member 604 may be employed to controllably rotate or tilt optical block 602 in the directional plane indicated by arrow 650 of FIG. 6 using drive mechanism 608 (e.g., standard brushless DC electric motor and/or associated gear box) that is operatively coupled to support member 604. Camera assembly 600 may be coupled to a stationary member (e.g., wall, ceiling or other suitable structural member) by a rotatable assembly (not shown) so that camera assembly base member 610 may also be rotated so that base member may be employed to controllably rotate or pan optical block 602 in the directional plane indicated by arrow 652 of FIG. 6 using a suitable drive mechanism (also not shown). Although not shown, camera assembly 600 may be optionally contained within a spherical or semispherical camera assembly dome enclosure or other suitable enclosure.

FIG. 6 illustrates just one exemplary embodiment of the manner in which a camera optical block may be configured and movably mounted as part of a PTZ camera assembly employed in the practice of the disclosed systems and methods. In this regard, it will be understood that a camera optical block may have a single linear optical path, or may be configured with other geometries, e.g., folded light path optical block. A camera optical block may also be mounted using any other configuration of structural members and/or drive mechanisms suitable for controllably rotating an optical block in one or more directional planes, including using conventional PTZ camera drive mechanisms or any other combinations of drive and/or rotation mechanisms suitable for rotating a camera optical block about one or more rotational axes.

Examples of camera optical block configurations (e.g. folded optical blocks) and mechanisms for mounting and/or drive mechanisms for moving camera optical blocks as part of a camera assembly that may be employed in the practice of the disclosed systems and methods may be found, for example, in concurrently filed U.S. patent application Ser. No. 10/732,195, entitled "Electromagnetic Circuit And Servo Mechanism For Articulated Cameras", by Thao D. Hovanky et al., in concurrently filed U.S. patent application Ser. No. 10/732,924, entitled "Slip Ring Apparatus", by Richard G. Washington and Thao D. Hovanky, and in U.S. patent application Ser. No. 10/732,193, entitled "Optical Block Assembly", by Thao D. Hovanky and Richard G. Washington, each of the foregoing patent applications being incorporated herein by reference. Examples of other methods and mechanisms that may also be implemented with camera assemblies in the practice of the disclosed systems and methods may be found, for example, in concurrently filed U.S. patent application Ser. No. 10/732,740, entitled "Systems And Methods For Actuating Lens Assemblies", by Thao D. Hovanky, and in concurrently filed U.S. patent application Ser. No. 10/732,192, entitled "Thermally Cooled Imaging Apparatus", by Richard G. Washington and Thao D. Hovanky, each of the foregoing patent applications being incorporated herein by reference.

Still referring to the exemplary embodiment of FIG. 6, camera assembly 600 also includes a differential antenna apparatus in the form of a differential antenna array 621 coupled to associated electronics that may include embedded or integrated RFID receiver circuitry 605 that may be physically coupled to other components of camera assembly 600 as illustrated, or in other suitable manner and/or location. Differential antenna array 621 includes four RFID antennas 622 that are mounted on each side, above, and below the optical block 602 in symmetrical fashion, in this case in a position adjacent light or image-gathering lens 603. Each of RFID antennas 622 is shown coupled to optical block 602 by mounting pads 624 that extend outwardly from optical block 602, and are shown oriented in manner to allow reception of RFID signals from the same direction that light is received by lens 603. Such a configuration may be employed, for example, to allow for a close alignment of the antennas 622 with the optical line of sight (LOS) of optical block 602. In the illustrated exemplary embodiment of FIG. 6, a first pair of RFID antennas 622a located above and below the optics block are cooperatively employed together for vertical alignment purposes (e.g., in the tilt axis direction of arrow 650) and a second pair of RFID antennas 622b located on each side of the optics block are cooperatively employed together for horizontal alignment purposes (e.g., in the pan axis direction of arrow 652). In one exemplary embodiment, rotation in the pan axis direction may be, for example, rotation of the assembly about a vertical axis, and rotation in the tilt axis direction may be, for example, rotation of the assembly about a horizontal axis.

In the practice of the disclosed systems and methods, a differential antenna apparatus may be configured with any type or combination of types of one or more antennas, directional antennas, antenna arrays, or other devices or combinations thereof suitable for directionally receiving electromagnetic radiation, such as RF signals from a RFID tag. In one embodiment, examples of suitable RFID antenna devices that may be employed in the practice of the disclosed systems and methods include, but are not limited to, printed circuit board-based antenna devices, wire-based antenna devices, grid rod antenna devices, etc. available from suppliers such as Texas Instruments of Plano, Tex. and Active Wave, Inc. of Boca Raton, Fla. Such antenna devices may be designed and/or configured to fit the needs of a given application based on a number of considerations including, but not limited to, form factor size of a given application, electromagnetic environment of a given application (e.g., metal in the installation area, shielding around the camera optical block, metal in the optical block and other camera assembly components, space between the antenna elements), etc.

Furthermore, it will be understood that FIG. 6 illustrates just one exemplary configuration of differential antenna array that may be employed in the practice of the disclosed systems and methods, and that any other differential antenna array configuration suitable for alignment of a camera optics block in one or more axis may be employed, e.g., including antenna arrays having more than four RFID antennas, antenna arrays having less than four RFID antennas, antenna arrays having RFID antennas located in positions other than vertically above and below and horizontally to either side of the optics block, and antenna arrays having RFID antennas located in positions other than adjacent a light or image-gathering lens of an optical block. In this regard, a differential antenna array may be directionally aligned with a camera optical block by configuring multiple directional RFID antennas in any position and/or manner to allow reception of RFID signals from the same direction that light is received by a light or image-gathering lens of the optical block, and so that a directional line of reception of the differential antenna array moves in a manner cooperatively with movement of the LOS of the optical block, whether in a manner proportionately or not thereto. Thus, a differential antenna array may be operatively coupled to an optical block at a location other than symmetrically adjacent the image or light gathering lens of the optical block (e.g., multiple antennas coupled symmetrically around the image sensor end of the optical block, a symmetrical array of antennas coupled to extend from one side of the optical block, etc.), may be coupled to a structural member or other part of the camera assembly that moves with an optical block, may be coupled to a structural member that is not part of the camera assembly but that moves with an optical block, etc.

It will be understood that a differential antenna apparatus, such as differential antenna array 621 illustrated in FIG. 6, may be optionally coupled to an embedded transmitter or transceiver component of a camera assembly for transmitting RFID identifier information to RFID tags 110, e.g., in a manner as previously described herein. In this regard, all or only a portion of the antennas or antenna elements of a differential antenna array may be utilized for RFID transmission purposes, for example, depending on the gain desired. Alternatively, a different antenna array (differential or non-differential/non-directional) may be employed for transmitting RFID identification information from an embedded RFID transceiver. For example, a separate 360° broadcast antenna may be configured in a camera assembly base member for RFID transmitting use by an transmitter or transceiver embedded in the camera assembly.

In one embodiment of the disclosed systems and methods, respective signals from multiple RFID antennas may be coupled to any signal conditioning/processing circuitry suitably configured to create one or more output signals related to or based on overall signal strength and/or differential signal strength. For example referring to the exemplary embodiment of FIG. 7A, the first pair of RFID antennas 622a of FIG. 6 may be coupled to provide received RF signals 710 and 712 to the exemplary signal processing electronics circuit 700 as shown. As illustrated, the signal processing electronics circuit 700 of FIG. 7 may include, but are not limited to, RF amplifiers 714 and 716 and narrow band filters 718 and 720 (shown respectively coupled to each RFID antenna 622a). Also shown included in signal processing electronics 700 are first summation circuit block 722 and second summation circuit block 724, with delay block 726 coupled therebetween as shown.

Figure 7A:
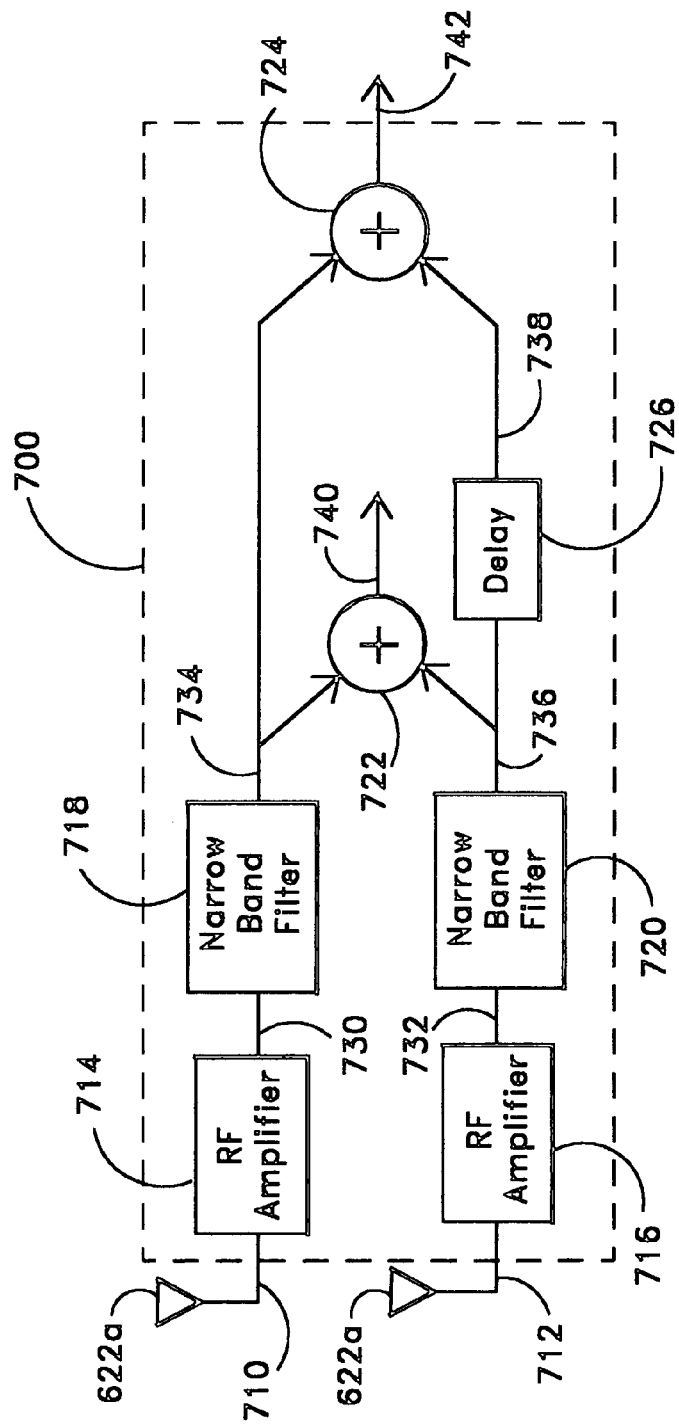
FIG. 7A illustrates a signal processing circuitry according to one embodiment of the disclosed systems and methods.

Although not illustrated, it will be understood that the second pair of RFID antennas 622b may be similarly coupled to a second signal processing circuit having the same configuration as first signal processing circuit 700, e.g.,. for horizontal alignment purposes. Thus, for purposes of illustration, FIG. 7A shows the first pair of RFID antennas 622a of FIG. 6 coupled to a first signal processing circuit 700, e.g. for vertical alignment purposes, it being understood that a separate signal processing circuit channel 700 may be provided for each respective pair of RFID antennas 622a and 622b of FIG. 6 (i.e., a vertical channel for RFID antennas 622a positioned above and below the optics block 621, and a horizontal channel for RFID antennas 622b positioned to each side of the optics block 621). In this regard, FIG. 7 illustrates an exemplary signal processing electronics circuit channel that may be employed for either one of the vertical or horizontal signal processing circuit channels, with a separate signal processing circuit channel being provided for each.

Still referring to FIGS. 6 and 7A, when an activated RFID tag 110 transmits a broadcast response 651, first and second antenna pairs 622a and 622b of camera assembly 600 each receive the broadcast response 651, and in response thereto each antenna pair 622a and 622b provides RF signals to the respective signal processing electronics coupled to the given antenna pair. For example, as shown in FIG. 7A, first antenna pair 622a provides RF signals 710 and 712 to respective RF amplifiers 714 and 716 for signal amplification. Amplified RF signals 730 and 732 are then provided to respective narrow band filters 718 and 720, which output respective filtered signals 734 and 736. Signals 734 and 736 are in turn summed in first summation circuit block 722 to produce a summed signal 740 indicative of the strength of the RF signal received by antenna pair 622a. Signal strength signal 740 may be optionally combined with a similar signal strength signal from processing electronics coupled to antenna pair 622b and the resulting combined signal used as a measure of the received RFID signal strength at the location of the given camera assembly 600. In alternative embodiments, any given one or more combinations of RFID signals received by multiple antennas of a differential antenna array 621 (e.g., summed signal 740 or either one of un-summed signals 734 or 736) may be used as a measure of received RFID signal strength. As described in relation to steps 412 and 414 of the exemplary embodiment of FIG. 4, received RFID signal strength may be provided to a computer processor 310 and used to determine and select one or more camera assemblies receiving the strongest RFID response signals.

As illustrated in FIG. 7A, delay circuitry 726 may be used to delay filtered signal 736 corresponding to a first one of antennas 622a relative to filtered signal 734 corresponding to a second one of antennas 622a. In this regard, delay circuitry 726 may be configured to receive signal 736 and to produce a delayed signal 738 that is delayed relative to signal 736 by, for example, a delay factor of about 180°. Delayed signal 738 may then be summed with undelayed signal 736 in second summation circuit block 724 to produce differential output signal 742.

In one exemplary embodiment, all or a portion of signal processing circuitry 700 may be integrated with or otherwise configured as a part of camera assembly 600, e.g., structurally attached to or integrated with optical block 602 and/or differential antenna array 621, contained in camera assembly base member 610, etc. However, it is also possible that all or a portion of signal processing circuitry 700 may be operatively disposed or positioned in any other suitable location, e.g., contained in housing that is separate from camera assembly 600 and physically positioned adjacent to or remote to camera assembly housing 600. In any case, both the differential output signal 742 and signal strength signal 740 outputs shown may be demodulated and fed into high speed A/D converters (not shown). The outputs of these A/D converters may then provided to an onboard or offboard digital signal processor ("DSP") (also not shown) for final processing in a manner as described further herein (e.g., building and/or processing a lookup table of optical block position versus corresponding values of signal strength signal 740 and differential output signal 742 received from separate signal processing circuitry 700).

Figure 7B:
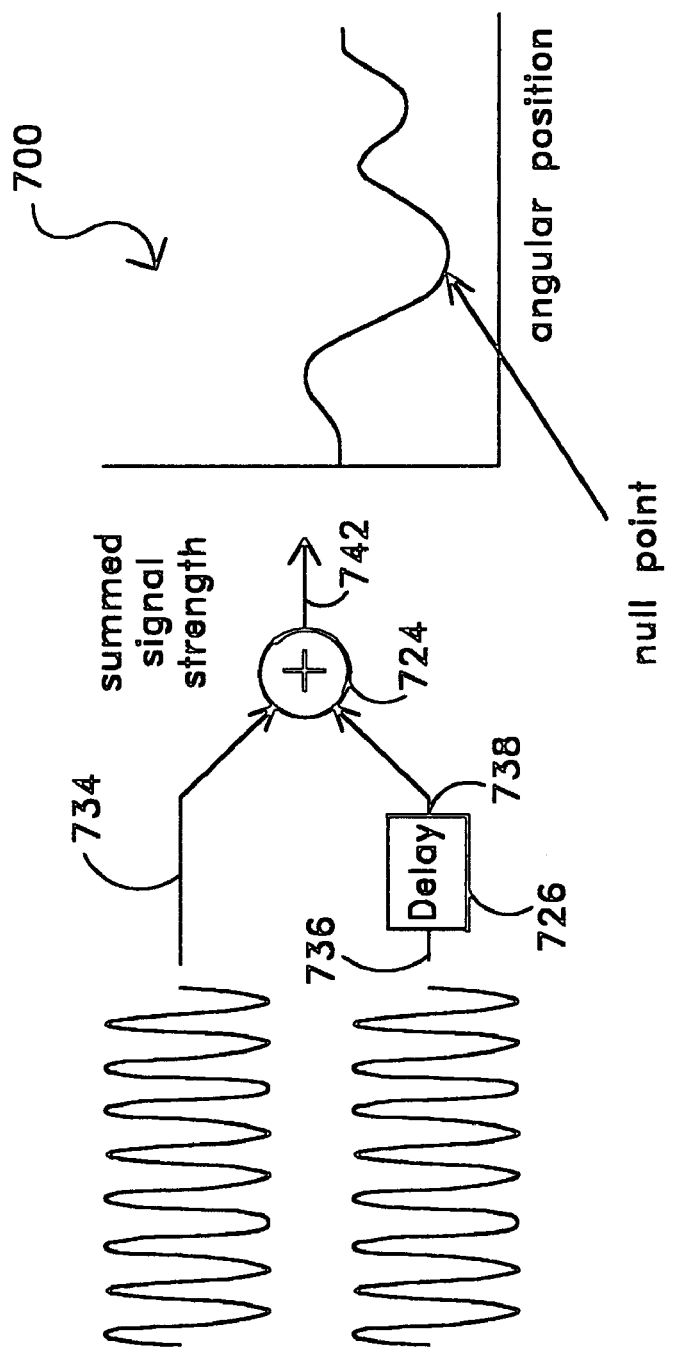
FIG. 7B illustrates summation of signals and summed signal strength as a function of angular position according to one embodiment of the disclosed systems and methods.

FIG. 7B shows summed signal strength magnitude of differential output signal 742 relative to angular position of camera 600. As shown in plot 700 of FIG. 7B, with a delay factor of 180° the magnitude of the summed signal strength of differential output signal 742 reaches a null point (or minimum absolute value) when filtered signals 734 and 736 have the same magnitude, i.e., when the vertical angular position of differential antenna array is such that each of the two antennas 622a are positioned at an equal distance from transmitting RFID tag 110, indicating alignment of the LOS of optical block 602 of camera assembly 600 with the transmitting RFID tag 110. It will be understood that any other delay factor (e.g., greater or lesser than about 180°) may be employed that is suitable for producing a summed signal strength indicative of vertical angular position of the LOS of optical block 602.

It will be understood that FIGS. 7A and 7B illustrate just one exemplary embodiment of signal processing circuitry and methodology that may be employed in the practice of the disclosed systems and methods. In this regard, one or more of the particular illustrated circuit components of signal processing circuitry 700 (e.g., RF amplifiers, narrow band filters, delay circuitry, summation circuit blocks, etc.) may be absent or may be supplemented by additional similar or different components in any other combination suitable for measuring received RFID signal strength and for indicating alignment of LOS of optical block 602 with a transmitting RFID tag 110. Furthermore, it will be understood that any alternative signal processing methodology and/or circuitry may be employed that is suitable for measuring received RFID signal strength at a camera assembly, and/or for using one or more directional antenna elements or antenna element arrays to align the LOS of a camera optical block with a transmitting RFID tag. For example, two or more antenna elements may be configured non-symmetrically around the LOS of a camera block and/or the signals received by separate antenna elements of an antenna array may be processed through a separate analog to digital converter ("ADC") and then provided to a digital signal processor ("DSP") for processing using digital summation, subtraction and delay functions to align the LOS of the camera optical block with a transmitting RFID tag.

In one exemplary embodiment, a suitable processor (e.g., DSP, microprocessor or microcontroller, etc.) may build a lookup table of optical block position versus corresponding signal strength and differential output signal values. This may be done for each axis in which the camera assembly optical block rotates (e.g., once for rotation in a horizontal pan axis, and once for rotation in a vertical tilt axis). The processor may eliminate or "weed out" null point values that correspond to zero signal strength values for the same optical block position. The processor may also optionally eliminate null point values that correspond to signal strength values that do not meet a selected minimum signal strength value for the same optical block position. The process of rotating the camera assembly optical block through each axis of rotation and building a corresponding table of optical block position versus corresponding signal strength and differential output signal values may be controlled by the same processor and/or repeated as many times as necessary until suitable null point values are determined for each axis.

A processor (e.g., DSP, microprocessor or microcontroller, etc.) responsible for building and processing a lookup table of optical block position versus corresponding signal strength and differential output signal values may be embedded in the camera assembly or may be located offboard or external to the camera assembly. It is also possible that one or more of the above-described tasks (e.g., determining signal strength and differential output signal values, building a table of these values, eliminating values corresponding to zero and/or relatively low signal strength, selecting null point position/s, controlling camera sweep operation, etc.) may be performed by more than one processor. In such a case, multiple processors may be integrated or embedded in the camera assembly to perform these tasks (e.g. servo control DSP provided on camera assembly for controlling camera rotation, and secondary processor provided on camera assembly for performing null point identification), one or more of the multiple processors may be embedded and one or more of the other processors may be located remote or offboard to the camera assembly, or all of the processors may be located remote or offboard to the camera assembly.

In one exemplary embodiment, a servo control DSP embedded in a camera assembly may build and process a lookup table of optical block position versus corresponding signal strength and differential output signal values. In another exemplary embodiment, a co-processor embedded in a camera assembly separate from a servo control DSP may build and process a lookup table of optical block position versus corresponding signal strength and differential output signal values. In another exemplary embodiment, an offboard processor that is remote from the camera assembly (e.g., computer processor 310 of system 300 of FIG. 3) may build and process a lookup table of optical block position versus corresponding signal strength and differential output signal values.

In one embodiment, a network of multiple PTZ camera assemblies 600 may be deployed as part of a visual locating system, such as visual locating system 300 of FIG. 3. When a RFID tag 110 is initially activated and its broadcast response detected by one or more receivers of the visual locating system, all or a given portion of the camera assemblies 600 on the network of the visual locating system may be employed to determine the signal strength at their specific location. In this regard, all camera assemblies 600 may be activated to make the signal strength determination, or alternatively only those camera assemblies 600 receiving a broadcast RFID response (or that are positioned in an area where a broadcast RFID response has been received) may be selected to make the signal strength determination. In either case, as described in relation to steps 416 and 418 of FIG. 4, camera assemblies 600 that are being subjected to a signal strength that exceeds a preset threshold limit may then proceed to scan (i.e., pan and tilt) through their full range of motion. As depicted and described in relation to FIG. 7B, the summed signal strength of the delayed and non-delayed antenna outputs of a given vertical or horizontal antenna pair 622 will vary as a function of respective vertical or horizontal angular position of the antenna pair in relation to RFID tag 110. In a non-cluttered environment (e.g., a non-reflective environment where a relatively clear path exists between transmitting RFID tag 110 and differential antenna array 621) this would result in the existence of only one absolute null LOS position (e.g., where both horizontal and vertical null points coincide) which would correspond to alignment of the camera LOS with the RFID tag 110, for example, to within about +/−5 degrees.

In one exemplary embodiment, once the selected PTZ camera assemblies 600 of a visual locating system 300 have completed their scans, each camera assembly 600 may return its scan results (e.g., visual image taken from a null LOS position at which both horizontal and vertical null points exist) to computer processor 310 of a visual locating system 300. In the event only one null LOS position exists for each camera assembly 600, the computer processor 310 may display the visual images from each camera assembly 600 that is associated with the null LOS position to a system operator, who may view and select the appropriate or desired image (e.g., as described in relation to steps 424 through 430 of FIG. 4). In this regard, FIG. 9 illustrates one exemplary embodiment in which two visual image windows 902 and 904 (e.g., taken at two null LOS positions by the same camera) are simultaneously displayed via GUI on computer monitor 900. An operator may select the desired image (e.g., step 430 of FIG. 4) by clicking with a mouse pointer on the appropriate "Select" button icon 906 or 908. Alternatively, the operator may request a re-scan by the visual locating system 300 by clicking a mouse pointer on the "Rescan" button icon. It will be understood that FIG. 9 illustrates just one simple exemplary embodiment of GUI that may be employed in the practice of the disclosed systems and methods, and that additional selection features and/or different selection methods (e.g., other than GUI display) may be alternatively or additionally employed that are suitable for implementing one or more of the features described herein.

Figure 8:
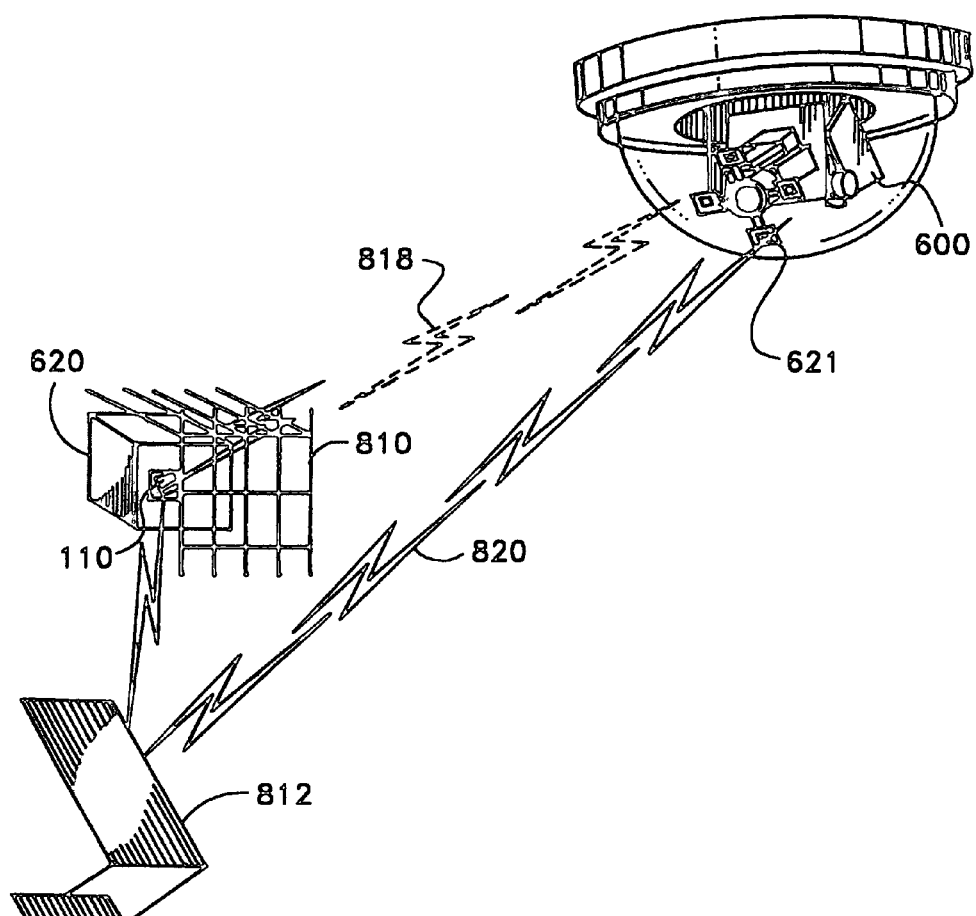
FIG. 8 illustrates a camera assembly and RFID-tagged object according to one embodiment of the disclosed systems and methods.

Cluttered environments and obstructed RF paths may result in multiple null LOS positions for a given camera assembly. As shown in FIG. 8, an obstructed RF path 818 may exist, for example, if a screen 810 or other RF obstruction lies in-between the emitting RFID tag 110 and the receiving differential antenna array 621 of a camera assembly 600, while a clear RF path 820 is available to the differential antenna array 621 from a highly RF reflective surface 812, e.g., such as a reflective surface of a flat metal panel on the side of a forklift. In the event multiple null LOS positions exist, the computer processor 310 may display visual images associated with each respective multiple null LOS position of a given camera assembly 600 to the system operator, who may view and select the appropriate or desired image. For example, returning to the exemplary embodiment of FIG. 9, in the event of multiple null points that result in two null LOS camera positions, both camera views may be presented to the operator in the manner of visual image windows 902 and 904 so that a final selection may be made in the manner as described above. Once the selection has been made, the full view and zoomed view of the tagged object may be provided, for example, as described earlier in relation to step 432 of FIG. 4 and as shown in FIG. 5.

In one exemplary embodiment, a visual locating system may be configured to gradually provide improved performance (ie., more relevant selections) over time by automatically discarding null points and/or null LOS positions based on selection/s made by an operator, e.g., those null LOS positions rejected by an operator that correspond to highly reflective fixed location objects such as metal walls, soft drink machines, etc. For example, a computer processor 310 of a visual locating system 300 may store in memory or otherwise record or remember LOS positions for individual camera assemblies 600 corresponding to rejected visual images or visual images specifically identified by an operator for discarding from future scanning operations. In another exemplary embodiment, if an image/angular location is routinely discarded by the operator, a message may be displayed that asks if the operator would like to place this solution at the bottom of the list in terms of display priority. In yet another exemplary embodiment, it is possible to categorize and/or store for future reference LOS positions for particular camera/s corresponding to particular identified objects, types of identified objects, etc. Using such stored LOS information, the history of movement (or non-movement) of an object throughout an area may be stored and retrieved when desired, e.g., in graphical or textual form.

Alignment or re-alignment of a visual tracking differential antenna array 621 with the LOS of an associated camera assembly optical block 602 may be performed in any suitable manner and/or at any suitable time or place (e.g., at the factory prior to system installation, in the field after installation, etc.) In this regard, initial alignment of the differential antenna array may be performed, for example, at the factory using a known RFID tag source (i.e., having a fully characterized and understood signal strength/pattern under the alignment procedure conditions) and using automated correlation of the tag/target to the center of the LOS. This alignment may involve auto-correlation of the image based on known visible characteristics of the tag/target. To support this auto-correlation the tag may be embedded in a well defined optical target.

Such an alignment procedure may be performed, for example, by mechanical alignment of the LOS of a camera assembly optical block with an associated differential antenna array in a shielded room or anechoic chamber. For example, during assembly a camera assembly optical block may be pre-aligned in a test jig so that the LOS of the optical block is directly pointed at and aligned with a known RFID target source. The RFID source may be activated and RFID signals received by the differential antenna array. Based on the received RFID signals, a position of the RFID target source may be calculated based on the directional line of reception of the differential antenna array. Using this calculated position of the RFID target source, the directional line of reception of the differential antenna array may be compared to the LOS of the camera optical block (which is known to be aligned with the RFID target source). Based on this comparison, offset coefficients or other correction factors may be derived to correct for any difference between the directional line of reception of the differential antenna array and the LOS of the camera optical block. Such correction factors may be, for example, stored in Flash or EEPROM memory (or any other suitable data storage device of the camera assembly circuitry) and used during future camera assembly operation to adjust the directional line of reception of the differential antenna array to match the optical block LOS.

Alternately, alignment of the LOS of a camera assembly optical block with an associated differential antenna array may be performed at a higher level of assembly by visually aligning a LOS of a camera assembly optical block with a known RFID target source, e.g., by visually aligning a cross hair or other visual characteristic of the RFID target source with an optical block tick mark or electronically-generated reticule that coincides with the LOS of the optical block. The RFID source may then be activated and RFID signals received by the differential antenna array used to compare the directional line of reception of the differential antenna array with the LOS of the visually-aligned camera optical block. Based on this comparison, offset coefficients or other correction factors may be derived and stored in the camera assembly circuitry for future use in a manner as previously described. It will be understood the previously described alignment procedures are exemplary only, and that any other method suitable for aligning the LOS of a camera assembly optical block with an associated differential antenna array may be employed.

While the invention may be adaptable to various modifications and alternative forms, specific embodiments have been shown by way of example and described herein. However, it should be understood that the invention, is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

REFERENCES

The following references, to the extent that they provide exemplary system, apparatus, method, or other details supplementary to those set forth herein, are specifically incorporated herein by reference.

U.S. Provisional patent application Ser. No. 60/437,711 entitled "Electromagnetic Circuit And Servo Mechanism For Articulated Cameras", by Thao D. Hovanky.

Concurrently filed U.S. patent application Ser. No. 10/732,195 entitled "Electromagnetic Circuit And Servo Mechanism For Articulated Cameras", by Thao D. Hovanky et al.

U.S. Provisional patent application Ser. No. 60/437,710 entitled "Systems And Methods For Actuating Lens Assemblies", by Thao D. Hovanky.

Concurrently filed U.S. patent application Ser. No. 10/732,740 entitled "Systems And Methods For Actuating Lens Assemblies", by Thao D. Hovanky.

U.S. Provisional patent application Ser. No. 60/437,712 entitled "Slip Ring Apparatus", by Richard G. Washington and Thao D. Hovanky.

Concurrently filed U.S. patent application Ser. No. 10/732,924 entitled "Slip Ring Apparatus", by Richard G. Washington and Thao D. Hovanky.

U.S. Provisional patent application Ser. No. 60/437,690 entitled "Optical Block Assembly", by Thao D. Hovanky and Richard G. Washington.

Concurrently filed U.S. patent application Ser. No. 10/732,193 entitled "Optical Block Assembly", by Thao D. Hovanky and Richard G. Washington.

U.S. Provisional patent application Ser. No. 60/437,709 entitled "Thermoelectric Cooled Imaging Apparatus", by Richard G. Washington and Thao D. Hovanky.

Concurrently filed U.S. patent application Ser. No. 10/732,192 entitled "Thermally Cooled Imaging Apparatus", by Richard G. Washington and Thao D. Hovanky.

U.S. Provisional patent application Ser. No. 60/456,294 entitled "Systems And Methods For Creation, Transmission, And Viewing Of Multi-Resolution Video", by Richard G. Washington.

What is claimed is:

1. A visual locating system, comprising:
   a plurality of camera assemblies, each of said camera assemblies comprising an optical block and an embedded RF receiver, said RF receiver being embedded in said camera assembly and configured to receive from a RF antenna one or more RF signals comprising a RFID broadcast transmitted by a RFID device;
   a computer processor in communication with each of said plurality of camera assemblies;
   wherein each of said plurality of camera assemblies comprises a differential antenna apparatus, said differential antenna apparatus being configured to receive and provide one or more RF signals comprising a RFID broadcast transmitted by a RFID device to said RF receiver of said respective camera assembly;
   wherein said differential antenna apparatus of each of said plurality of camera assemblies is directionally aligned with an optical block of said respective camera assembly;
   wherein said visual location system further comprises signal processing circuitry configured to receive said one or more RF signals from said differential antenna apparatus, and to provide at least one of a signal strength signal or a differential output signal based upon said one or more RF signals;
   wherein said signal processing circuitry is configured to identify and select one or more of said signal strength signals that are indicative of a RF signal strength value that exceeds a minimum RF signal strength value; and
   wherein each of said camera assemblies comprises a PTZ camera assembly, and wherein said computer processor is configured to provide a command signal to a selected one or more of said PTZ camera assemblies, said command signal causing said selected one or more of said PTZ camera assemblies to each scan in pan and tilt directions while receiving said RF signal from said differential antenna apparatus; and wherein each of said one or more camera assemblies is configured to provide a visual image signal corresponding to one or more null line of sight (LOS) positions of said optical block of said respective camera assembly to said computer processor.

2. A visual locating system, comprising:
   a plurality of camera assemblies, each of said camera assemblies comprising an optical block and an embedded RF receiver, said RF receiver being embedded in said camera assembly and configured to receive from a RF antenna one or more RF signals comprising a RFID broadcast transmitted by a RFID device;

a computer processor in communication with each of said plurality of camera assemblies;

wherein each of said plurality of camera assemblies comprises a differential antenna apparatus, said differential antenna apparatus being configured to receive and provide one or more RF signals comprising a RFID broadcast transmitted by a RFID device to said RF receiver of said respective camera assembly;

wherein said differential antenna apparatus of each of said plurality of camera assemblies is directionally aligned with an optical block of said respective camera assembly;

wherein said visual location system further comprises signal processing circuitry configured to receive said one or more RF signals from said differential antenna apparatus, and to provide at least one of a signal strength signal or a differential output signal based upon said one or more RF signals;

wherein said signal processing circuitry is configured to identify and select one or more of said signal strength signals that are indicative of a RF signal strength value that exceeds a minimum RF signal strength value; and wherein each of said camera assemblies comprises a PTZ camera assembly; wherein each of said camera assemblies comprises signal processing circuitry associated with said respective camera assembly; wherein said each of said respective camera assemblies is configured to scan in pan and tilt directions while receiving said RF signal from a differential antenna apparatus of said respective PTZ camera assembly; wherein said signal processing circuitry associated with each of said camera assemblies is configured to provide one or more differential output signals while a respective camera assembly associated with said signal processing circuitry is scanning in pan and tilt directions; and wherein said signal processing circuitry is configured to identify one or more null line of sight (LOS) positions of said optical block of said camera assembly associated with said signal processing circuitry based on said one or more differential output signals.

3. The visual locating system of claim 2, wherein each of said plurality of camera assemblies comprises a differential antenna array.

4. The visual locating system of claim 2, wherein each of said plurality of camera assemblies further comprises a RF transceiver and said RF antenna; and wherein said RF transceiver is configured to provide a RF signal comprising RFID device activation data to said RF antenna of said respective camera assembly.

5. The visual locating system of claim 2, wherein each of said camera assemblies comprises a PTZ camera assembly, and wherein said signal processing circuitry of each of said camera assemblies is embedded as a single processor in said camera assembly.

6. The visual locating system of claim 2, wherein said signal processing circuitry of each of said camera assemblies comprises a first circuit that is configured to provide one or more differential output signals to a separate processor of said signal processing circuitry while a respective camera assembly associated with said signal processor circuitry is scanning in pan and tilt directions; wherein said separate processor is configured to identify one or more null line of sight (LOS) positions of said optical block of said respective camera assembly based on said one or more differential output signals, and to provide a command signal causing said respective camera assembly to scan in pan and tilt directions while receiving said RF signal from said differential antenna apparatus.

7. The visual locating system of claim 6, wherein said separate processor comprises said computer processor.

8. The visual locating system of claim 6, wherein said first circuit of each of said camera assemblies is embedded in said respective camera assembly, and wherein said separate processor comprises a second processor embedded in said camera assembly.

9. The visual locating system of claim 2, wherein said computer processor is coupled to a visual display device, and is configured to display on said visual display device one or more visual images corresponding to each of said null LOS positions.

10. The visual locating system of claim 9, wherein said computer processor is configured to selectively display one or more of said visual images corresponding to each of said null LOS positions in response to selection data received from a system operator.

11. The visual locating system of claim 10, wherein said computer processor is configured to allow said system operator to select or reject one or more of said visual images.

12. The visual locating system of claim 11, wherein said computer processor is configured to associate a selected visual image corresponding to a null LOS position of at least one of said camera assemblies with the identity of a particular RFID device that corresponds to said RFID broadcast transmitted by said particular RFID device, so that said selected visual image is displayed in the future in response to said RFID broadcast transmitted by said particular RFID device.

13. The visual locating system of claim 11, wherein said computer processor is configured to associate a rejected visual image corresponding to a null LOS position of at least one of said camera assemblies so that said rejected visual image is not displayed again in the future.

14. The visual locating system of claim 2, wherein said computer processor is configured to provide a command signal to each of said one or more selected camera assemblies to provide a zoomed visual image signal and a non-zoomed visual image corresponding to each of said null LOS positions of said optical block of said respective camera assembly to said computer processor; wherein said computer processor is coupled to a visual display device; and wherein said computer processor and is configured to simultaneously display on said visual display device a zoomed visual image and a non-zoomed visual image corresponding to each of said null LOS positions.

15. The visual locating system of claim 2, wherein said plurality of camera assemblies of said visual locating system are installed in a passenger terminal.

16. The visual locating system of claim 15, wherein said passenger terminal comprises an airport.

17. A method of visually locating objects, comprising:
associating a RFID device with an object;
providing a camera assembly unit comprising an optical block and an embedded RF receiver, said RF receiver being embedded in said camera assembly and configured to receive from an antenna an RF signal comprising a RFID broadcast transmitted by said RFID device;
receiving a RFID broadcast transmitted by said RFID device, said RFID broadcast being received by said RF receiver from said antenna; and
visually locating said object using said optical block of said camera assembly based on said RFID broadcast received by said RF receiver from said antenna;

wherein said camera assembly unit further comprises a differential antenna apparatus, and wherein said method further comprises using said differential antenna apparatus to receive and provide said RF signal comprising a RFID broadcast transmitted by a RFID device to said RF receiver; and wherein said method further comprises using said optical block to visually scan a field of view of said optical block corresponding to a location of said RF transmission broadcast by said RFID device; and selecting one or more visual images from said scan, said one or more visual images being directionally selected based on directional reception characteristics of said RF transmission broadcast received by said differential antenna apparatus.

18. The method of claim 17, further comprising presenting one or more of said selected visual images from said scan to an operator.

19. The method of claim 18, further comprising allowing said operator to pick at least one of said multiple visual images for selective display; wherein said selective display comprises presenting a zoomed version of at least a portion of said picked visual image.

20. The method of claim 18, further comprising allowing said operator to reject at least one of said selected multiple visual images.

21. The method of claim 20, further comprising presenting one or more of said selected visual images other than said rejected visual image.

22. The method of claim 20, further comprising storing an identity of said rejected visual image; and eliminating said rejected visual image from future presentations of visual images to said operator based on an RFID broadcast transmitted by said RFID device associated with said object.

23. A method of visually locating objects, comprising:
associating a RFID device with an object;
providing a camera assembly unit comprising an optical block and an embedded RF receiver, said RF receiver being embedded in said camera assembly and configured to receive from an antenna an RF signal comprising a RFID broadcast transmitted by said RFID device;
receiving a RFID broadcast transmitted by said RFID device, said RFID broadcast being received by said RF receiver from said antenna; and
visually locating said object using said optical block of said camera assembly based on said RFID broadcast received by said RF receiver from said antenna;
wherein said camera assembly unit further comprises a differential antenna apparatus, and wherein said method further comprises using said differential antenna apparatus to receive and provide said RF signal comprising a RFID broadcast transmitted by a RFID device to said RF receiver; and
wherein said differential antenna apparatus is directionally aligned with said optical block of said camera assembly unit, and wherein said method further comprises visually aligning said optical block with said object by moving said optical block based on said RF signal received by said differential antenna apparatus.

24. The method of claim 23, wherein said differential antenna apparatus comprises a differential antenna array, and wherein said method further comprises visually aligning said optical block with said object by moving said optical block based on differences between said RF signal as separately received by each of two or more elements of said differential antenna array.

25. The method of claim 23, further comprising processing one or more RF signals from said differential antenna array to provide a differential output signal based upon said one or more RF signals; and wherein said method further comprises visually aligning said optical block with said object by moving said optical block based on said differential output signal.

26. A method of visually locating objects, comprising:
associating a RFID device with an object;
providing a camera assembly unit comprising an optical block and an embedded RF receiver, said RF receiver being embedded in said camera assembly and configured to receive from an antenna an RF signal comprising a RFID broadcast transmitted by said RFID device;
receiving a RFID broadcast transmitted by said RFID device, said RFID broadcast being received by said RF receiver from said antenna;
visually locating said object using said optical block of said camera assembly based on said RFID broadcast received by said RF receiver from said antenna; and
providing a network of multiple camera assemblies, said network of multiple camera assembly units comprising a part of a visual locating system; each of said multiple camera assembly units comprising an optical block, an embedded RF receiver and an embedded differential antenna apparatus; said embedded RF receiver being configured to receive from said differential antenna apparatus an RF signal comprising a RFID broadcast transmitted by said RFID device; and wherein said method further comprises receiving a RFID broadcast transmitted by said RFID device, said RFID being received by an embedded RF receiver of one or more of said camera assemblies; and visually locating said object by selecting at least one of said camera assemblies having a field of view corresponding to a location of said RF transmission broadcast by said RFID device and using an optical block of said selected at least one camera assembly based on said RFID broadcast received by said embedded RF receiver of said selected at least one camera assembly.

27. The method of claim 26, wherein said differential antenna apparatus of each camera assembly comprises a differential antenna array directionally aligned with said optical block of said camera assembly.

28. The method of claim 27, wherein each of said camera assemblies comprises a PTZ camera assembly.

29. The method of claim 28, wherein each of said camera assemblies comprises a PTZ camera assembly.

30. A visual locating system, comprising:
a plurality of camera assemblies, each of said camera assemblies comprising an optical block and a RF receiver, said RF receiver being configured to receive from a RF antenna one or more RF signals comprising a RFID broadcast transmitted by a RFID device; and
a computer processor in communication with each of said plurality of camera assemblies;
wherein each of said plurality of camera assemblies comprises a differential antenna apparatus, said differential antenna apparatus being configured to receive and provide one or more RF signals comprising a RFID broadcast transmitted by a RFID device to said RF receiver of said respective camera assembly;
wherein said differential antenna apparatus of each of said plurality of camera assemblies is directionally aligned with an optical block of said respective camera assembly;

wherein said visual locating system further comprises signal processing circuitry configured to receive said one or more RF signals from said differential antenna apparatus, and to provide at least one of a signal strength signal or a differential output signal based upon said one or more RF signals;

wherein said signal processing circuitry is configured to identify and select one or more of said signal strength signals that are indicative of a RF signal strength value that exceeds a minimum BY signal strength value; and wherein each of said camera assemblies comprises a PTZ camera assembly, and wherein said computer processor is configured to provide a command signal to a selected one or more of said PTZ camera assemblies, said command signal causing said selected one or more of said PTZ camera assemblies to each scan in pan and tilt directions while receiving said RF signal from said differential antenna apparatus; and wherein each of said one or more camera assemblies is configured to provide a visual image signal corresponding to one or more null line of sight (LOS) positions of said optical block of said respective camera assembly to said computer processor.

31. A visual locating system, comprising:

a plurality of camera assemblies, each of said camera assemblies comprising an optical block and a RF receiver, said RF receiver being configured to receive from a RF antenna one or more RF signals comprising a RFID broadcast transmitted by a RFID device; and a computer processor in communication with each of said plurality of camera assemblies;

wherein each of said plurality of camera assemblies comprises a differential antenna apparatus, said differential antenna apparatus being configured to receive and provide one or more RF signals comprising a RFID broadcast transmitted by a RFID device to said RF receiver of said respective camera assembly;

wherein said differential antenna apparatus of each of said plurality of camera assemblies is directionally aligned with an optical block of said respective camera assembly;

wherein said visual locating system further comprises signal processing circuitry configured to receive said one or more RF signals from said differential antenna apparatus, and to provide at least one of a signal strength signal or a differential output signal based upon said one or more RF signals;

wherein said signal processing circuitry is configured to identify and select one or more of said signal strength signals that are indicative of a RF signal strength value that exceeds a minimum RF signal strength value; and wherein each of said camera assemblies comprises a PTZ camera assembly; wherein each of said camera assemblies comprises signal processing circuitry associated with said respective camera assembly; wherein said each of said respective camera assemblies is configured to scan in pan and tilt directions while receiving said RF signal from a differential antenna apparatus of said respective PTZ camera assembly; wherein said signal processing circuitry associated with each of said camera assemblies is configured to provide one or more differential output signals while a respective camera assembly associated with said signal processing circuitry is scanning in pan and tilt directions; and wherein said signal processing circuitry is configured to identify one or more null line of sight (LOS) positions of said optical block of said camera assembly associated with said signal processing circuitry based on said one or more differential output signals.

32. The visual locating system of claim 31, wherein each of said camera assemblies comprises a PTZ camera assembly, and wherein said signal processing circuitry of each of said camera assemblies is embedded as a single processor in said camera assembly.

33. The visual locating system of claim 31, wherein said signal processing circuitry of each of said camera assemblies comprises a first circuit that is configured to provide one or more differential output signals to a separate processor of said signal processing circuitry while a respective camera assembly associated with said signal processor circuitry is scanning in pan and tilt directions; wherein said separate processor is configured to identify one or more null line of sight (LOS) positions of said optical block of said respective camera assembly based on said one or more differential output signals, and to provide a command signal causing said respective camera assembly to scan in pan and tilt directions while receiving said RF signal from said differential antenna apparatus.

34. The visual locating system of claim 33, wherein said separate processor comprises said computer processor.

35. The visual locating system of claim 33, wherein said first circuit of each of said camera assemblies is embedded in said respective camera assembly, and wherein said separate processor comprises a second processor embedded in said camera assembly.

36. The visual locating system of claim 31, wherein said computer processor is coupled to a visual display device, and is configured to display on said visual display device one or more visual images corresponding to each of said null LOS positions.

37. The visual locating system of claim 36, wherein said computer processor is configured to selectively display one or more of said visual images corresponding to each of said null LOS positions in response to selection data received from a system operator.

38. The visual locating system of claim 37, wherein said computer processor is configured to allow said system operator to select or reject one or more of said visual images.

39. The visual locating system of claim 38, wherein said computer processor is configured to associate a selected visual image corresponding to a null LOS position of at least one of said camera assemblies with the identity of a particular RFID device that corresponds to said RFID broadcast transmitted by said particular RFID device, so that said selected visual image is displayed in the future in response to said RFID broadcast transmitted by said particular RFID device.

40. The visual locating system of claim 38, wherein said computer processor is configured to associate a rejected visual image corresponding to a null LOS position of at least one of said camera assemblies so that said rejected visual image is not displayed again in the future.

41. The visual locating system of claim 31, wherein said computer processor is configured to provide a command signal to each of said one or more selected camera assemblies to provide a zoomed visual image signal and a non-zoomed visual image corresponding to each of said null LOS positions of said optical block of said respective camera assembly to said computer processor; wherein said computer processor is coupled to a visual display device; and wherein said computer processor and is configured to simultaneously display on said visual display device a zoomed visual image and a non-zoomed visual image corresponding to each of said null LOS positions.

42. The visual locating system of claim 31, wherein said plurality of camera assemblies of said visual locating system are installed in a passenger terminal.

43. The visual locating system of claim 42, wherein said passenger terminal comprises an airport.

44. A method of visually locating objects, comprising:
associating a RFID device with an object;
providing a camera assembly unit comprising an optical block and a RF receiver, said RF receiver being configured to receive from an antenna an RF signal comprising a RFID broadcast transmitted by said RFID device;
receiving a RFID broadcast transmitted by said RFID device, said RFID broadcast being received by said RF receiver from said antenna; and
visually locating said object using said optical block of said camera assembly based on said RFID broadcast received by said RF receiver from said antenna;
wherein said camera assembly unit further comprises a differential antenna apparatus, and wherein said method further comprises using said differential antenna apparatus to receive and provide said RF signal comprising a RFID broadcast transmitted by a RFID device to said RF receiver;
wherein said method further comprises using said optical block to visually scan a field of view of said optical block corresponding to a location of said RF transmission broadcast by said RFID device; and selecting one or more visual images from said scan, said one or more visual images being directionally selected based on directional reception characteristics of said RF transmission broadcast received by said differential antenna apparatus.

45. The method of claim 44, further comprising presenting one or more of said selected visual images from said scan to an operator.

46. The method of claim 45, further comprising allowing said operator to pick at least one of said multiple visual images for selective display; wherein said selective display comprises presenting a zoomed version of at least a portion of said picked visual image.

47. The method of claim 44, further comprising allowing said operator to reject at least one of said selected multiple visual images.

48. The method of claim 47, further comprising presenting one or more of said selected visual images other than said rejected visual image.

49. The method of claim 47, further comprising storing an identity of said rejected visual image; and eliminating said rejected visual image from future presentations of visual images to said operator based on an RFID broadcast transmitted by said RFID device associated with said object.

50. A method of visually locating objects, comprising:
associating a RFID device with an object;
providing a camera assembly unit comprising an optical block and a RF receiver, said RF receiver being configured to receive from an antenna an RF signal comprising a RFID broadcast transmitted by said RFID device;
receiving a RFID broadcast transmitted by said RFID device, said RFID broadcast being received by said RF receiver from said antenna; and
visually locating said object using said optical block of said camera assembly based on said RFID broadcast received by said RF receiver from said antenna;
wherein said camera assembly unit further comprises a differential antenna apparatus, and wherein said method further comprises using said differential antenna apparatus to receive and provide said RF signal comprising a RFID broadcast transmitted by a RFID device to said RF receiver; and
wherein said differential antenna apparatus is directionally aligned with said optical block of said camera assembly unit, and wherein said method further comprises visually aligning said optical block with said object by moving said optical block based on said RF signal received by said differential antenna apparatus.

51. The method of claim 50, wherein said differential antenna apparatus comprises a differential antenna array, and wherein said method further comprises visually aligning said optical block with said object by moving said optical block based on differences between said RF signal as separately received by each of two or more elements of said differential antenna array.

52. The method of claim 50, further comprising processing one or more RF signals from said differential antenna array to provide a differential output signal based upon said one or more RF signals; and wherein said method further comprises visually aligning said optical block with said object by moving said optical block based on said differential output signal.

53. The method of claim 50, said method comprising:
associating a first RFID device with a passenger; and
locating said passenger within said passenger terminal using a RF transmission broadcast by said first RFID device;
wherein said method comprises visually locating said passenger within said passenger terminal using at least one camera assembly; and
wherein said camera assembly comprises an optical block and an RF receiver embedded in said camera assembly.

54. The method of claim 53, wherein said first RFID device is attached to or contained within a RFID carrier assigned to said passenger.

55. The method of claim 54, wherein said RFID carrier comprises a ticket holder or a ticket assigned to said passenger.

56. The method of claim 53, wherein said method comprises visually locating said passenger within said passenger terminal using at least one camera assembly having a field of view corresponding to a location of said RF transmission broadcast by said first RFID device.

57. The method of claim 56, wherein said method comprises visually locating said passenger within said passenger terminal using a plurality of camera assemblies, wherein said passenger is visually located by selecting one or more of said camera assemblies having a field of view corresponding to a location of said RF transmission broadcast by said first RFID device.

58. The method of claim 57, wherein each of said plurality of camera assemblies comprises an optical block and an embedded RF receiver, said embedded RF receiver being embedded in said camera assembly and configured to receive from an antenna an RF signal comprising said RF transmission broadcast by said first RFID device.

59. The method of claim 57, wherein said method further comprises tracking said passenger within said passenger terminal using a visual locating system, said visual locating system comprising:
said plurality of camera assemblies, each of said camera assemblies comprising an optical block and a an embedded RF receiver, said RF receiver being embedded in said camera assembly and configured to receive from a RF antenna one or more RF signals comprising a RFID broadcast transmitted by said first RFID device; and a computer processor in communication with each of said plurality of camera assemblies.

60. The method of claim 59, wherein each of said plurality of camera assemblies further comprises a differential antenna apparatus, said differential antenna apparatus being configured to receive and provide one or more RF signals comprising a RFID broadcast transmitted by said first RFID device to said RF receiver of said respective camera assembly.

61. The method of claim 60, wherein each of said plurality of camera assemblies comprises a PTZ camera assembly.

62. The method system of claim 61, wherein each of said plurality of camera assemblies comprises a differential antenna array.

63. The method of claim 60, wherein said differential antenna apparatus of each of said plurality of camera assemblies is directionally aligned with an optical block of said respective camera assembly.

64. The method of claim 59, wherein each of said plurality of camera assemblies further comprises a RF transceiver and said RF antenna, said RF transceiver comprising said RF receiver or said respective camera assembly; and wherein said RF transceiver is configured to provide a RF signal comprising RFID device activation data for said first RFID device to said RF antenna of said respective camera assembly.

65. The method of claim 64, wherein said RF antenna of each of said plurality of camera assemblies comprises a differential antenna apparatus.

66. The method of claim 60, wherein said differential antenna apparatus is directionally aligned with a line of sight (LOS) of said optical block of said camera assembly unit; and wherein said visual locating system is configured to align said LOS of said optical block with a position of said passenger with the location of the source of said RFID broadcast transmitted by said first RFID device by determining the relationship between said LOS and said source location by analyzing the emitted signals from said first RFID device.

67. The method of claim 53, further comprising:
associating a second RFID device with a luggage item or carry on item of said passenger; and at least one of:
locating said luggage item within the luggage handling areas of said passenger terminal or on a passenger vehicle using a RF transmission broadcast by said first RFID device; or
locating said carry on item within said passenger terminal using a RF transmission broadcast by said second RFID device;
or a combination thereof.

68. The method of claim 67, wherein said method comprises locating said carry on item within said passenger terminal using a RF transmission broadcast by said second RFID device, and detecting when said location of said passenger differs from said location of said carry on luggage by a predetermined distance.

69. The method of claim 67, wherein said method comprises locating said luggage item within the luggage handling areas of said passenger terminal or on a passenger vehicle using a RF transmission broadcast by said first RFID device, and detecting when said passenger has not boarded the same passenger vehicle into which said luggage item has been loaded.

70. The method of claim 67, wherein said method comprises visually locating said luggage item within said luggage handling areas using a plurality of camera assemblies, wherein said luggage item is visually located by selecting one or more of said camera assemblies having a field of view corresponding to a location of said RF transmission broadcast by said second RFID device.

71. The method of claim 70, wherein said method further comprises tracking said luggage within said luggage handling areas using a visual locating system, said visual locating system comprising:
a plurality of camera assemblies, each of said camera assemblies comprising an optical block and a RF receiver, said RF receiver being configured to receive from a RF antenna one or more RF signals comprising a RFID broadcast transmitted by said second RFID device; and
a computer processor in communication with each of said plurality of camera assemblies;
wherein each of said plurality of camera assemblies further comprises a differential antenna apparatus, said differential antenna apparatus being configured to receive and provide one or more RF signals comprising a RFID broadcast transmitted by said second RFID device to said RF receiver of said respective camera assembly; and
wherein said differential antenna apparatus is directionally aligned with a line of sight (LOS) of said optical block of said camera assembly unit; and wherein said visual locating system is configured to align said LOS of said optical block with a position of said luggage item with the source location of said RFID broadcast transmitted by said second RFID device by determining the relationship between said LOS and said source location by analyzing the emitted signals from said second RFID device.

72. The method of claim 53, wherein said passenger terminal comprises an airport.

73. The method of claim 53, further comprising associating a photograph of said passenger with an identity of said first RFID device; receiving said RF transmission broadcast by said first RFID device at a station in said passenger terminal; and displaying said photograph for identity verification purposes at said station based upon receipt of said RF transmission broadcast at said station by said first RFID device.

74. The method of claim 50, wherein said camera assembly unit further comprises an RF transceiver, and wherein said method further comprises transmitting a RF signal comprising RFID device activation data to cause said RFID device to transmit said RFID broadcast.

75. The method of claim 50, wherein said camera assembly unit comprises a PTZ camera assembly unit.

76. A method of visually locating objects, comprising:
associating a RFID device with an object;
providing a camera assembly unit comprising an optical block and a RF receiver, said RF receiver being configured to receive from an antenna an RF signal comprising a RFID broadcast transmitted by said RFID device;
receiving a RFID broadcast transmitted by said RFID device, said RFID broadcast being received by said RF receiver from said antenna; and
visually locating said object using said optical block of said camera assembly based on said RFID broadcast received by said RF receiver from said antenna;

wherein said camera assembly unit further comprises a differential antenna apparatus, and wherein said method further comprises using said differential antenna apparatus to receive and provide said RF signal comprising a RFID broadcast transmitted by a RFID device to said RF receiver;

wherein said method further comprises providing a network of multiple camera assemblies, said network of multiple camera assembly units comprising a part of a visual locating system; each of said multiple camera assembly units comprising an optical block, an embedded RF receiver and an embedded differential antenna apparatus; said embedded RF receiver being configured to receive from said differential antenna apparatus an RF signal comprising a RFID broadcast transmitted by said RFID device; and wherein said method further comprises receiving a RFID broadcast transmitted by said RFID device, said RFID being received by an embedded RF receiver of one or more of said camera assemblies; and visually locating said object by selecting at least one of said camera assemblies having a field of view corresponding to a location of said RF transmission broadcast by said RFID device and using an optical block of said selected at least one camera assembly based on said RFID broadcast received by said embedded RF receiver of said selected at least one camera assembly.

77. The method of claim 76, wherein said differential antenna apparatus of each camera assembly comprises a differential antenna array directionally aligned with said optical block of said camera assembly.

78. The method of claim 77, wherein each of said camera assemblies comprises a PTZ camera assembly.

79. The method of claim 78, wherein each of said camera assemblies comprises a PTZ camera assembly.

80. A method of visually locating objects, comprising:
associating a RFID device with an object;
providing a camera assembly unit comprising an optical block and a RF receiver, said RF receiver being configured to receive from an antenna an RF signal comprising a RFID broadcast transmitted by said RFID device;
receiving a RFID broadcast transmitted by said RFID device, said RFID broadcast being received by said RF receiver from said antenna; and
automatically visually locating said object using said optical block of said camera assembly based on said RFID broadcast received by said RF receiver from said antenna;
wherein said camera assembly unit comprises a PTZ camera assembly unit and further comprises a differential antenna apparatus, and wherein said method further comprises:
using said differential antenna apparatus to receive and provide said RF signal comprising a RFID broadcast transmitted by a RFID device to said RF receiver,
using said optical block to visually scan a field of view of said optical block corresponding to a location of said RF transmission broadcast by said RFID device, and
directionally selecting one or more visual images based on directional reception characteristics of said RF transmission broadcast received by said differential antenna apparatus.

81. The method of claim 80, further comprising directionally selecting one or more of said visual images based on directional reception characteristics of said RF transmission broadcast received by said differential antenna apparatus; and presenting one or more of said selected visual images from said scan to an operator.

82. The method of claim 80, wherein said differential antenna apparatus is directionally aligned with said optical block of said camera assembly unit, and wherein said method further comprises visually aligning said optical block with said object by moving said optical block based on said RF signal received by said differential antenna apparatus.

83. A method of visually locating objects, comprising:
associating a RFID device with an object;
providing a camera assembly unit comprising an optical block and a RF receiver, said RF receiver being configured to receive from an antenna an RF signal comprising a RFID broadcast transmitted by said RFID device;
receiving a RFID broadcast transmitted by said RFID device, said RFID broadcast being received by said RF receiver from said antenna; and
automatically visually locating said object using said optical block of said camera assembly based on said RFID broadcast received by said RF receiver from said antenna; and
wherein said method further comprises providing a network of multiple camera assemblies, said network of multiple camera assembly units comprising a part of a visual locating system; each of said multiple camera assembly units comprising an optical block, an embedded RF receiver and an embedded differential antenna apparatus; said embedded RF receiver being configured to receive from said differential antenna apparatus an RF signal comprising a RFID broadcast transmitted by said RFID device; and wherein said method further comprises receiving a RFID broadcast transmitted by said RFID device, said RFID being received by an embedded RF receiver of one or more of said camera assemblies; and automatically visually locating said object by selecting at least one of said camera assemblies having a field of view corresponding to a location of said RF transmission broadcast by said RFID device and using an optical block of said selected at least one camera assembly based on said RFID broadcast received by said embedded RF receiver of said selected at least one camera assembly.

84. The method of claim 83, wherein each of said camera assemblies comprises a PTZ camera assembly.

85. A method of visually locating objects, comprising:
associating a RFID device with an object;
providing a camera assembly unit comprising an optical block and a RF receiver, said RF receiver being configured to receive from an antenna an RF signal comprising a RFID broadcast transmitted by said RFID device;
receiving a RFID broadcast transmitted by said RFID device, said RFID broadcast being received by said RF receiver from said antenna; and
automatically visually locating said object using said optical block of said camera assembly based on said RFID broadcast received by said RF receiver from said antenna;
wherein said camera assembly unit comprises a differential antenna apparatus that is directionally aligned with said optical block of said camera assembly unit, and wherein said method further comprises visually aligning said optical block with said object to visually track said object by moving said optical block based on said RF signal received by said differential antenna apparatus.

86. The method of claim 85, wherein said camera assembly unit comprises a PTZ camera assembly.

87. A visual location system, comprising:
a plurality of camera assemblies, each of said camera assemblies comprising an optical block and a RF receiver;
wherein said RF receiver is configured to receive from a RF antenna one or more RF signals comprising a RFID broadcast transmitted by a RFID device;
wherein said visual location system is configured to automatically visually locate said object using said optical block of said camera assembly based on said RFID broadcast received by said RF receiver from said antenna; and
wherein each of said camera assembly units comprises a PTZ camera assembly unit and further comprises a differential antenna apparatus configured to receive and provide said RF signal comprising a RFID broadcast transmitted by a RFID device to said RF receiver;
wherein said visual location system is configured to use said optical block to visually scan a field of view of said optical block corresponding to a location of said RF transmission broadcast by said RFID device; and
wherein said visual location system is further configured to directionally select one or more visual images based on directional reception characteristics of said RF transmission broadcast received by said differential antenna apparatus.

88. The system of claim 87, wherein said system is further configured to directionally select one or more of said visual images based on directional reception characteristics of said RF transmission broadcast received by said differential antenna apparatus; and to present one or more of said selected visual images from said scan to an operator.

89. The system of claim 87, wherein said differential antenna apparatus is directionally aligned with said optical block of said camera assembly unit, and wherein said system is further configured to visually align said optical block with said object by moving said optical block based on said RF signal received by said differential antenna apparatus.

90. A visual location system, comprising:
a plurality of camera assemblies, each of said camera assemblies comprising an optical block and a RF receiver;
wherein said RF receiver is configured to receive from a RF antenna one or more RF signals comprising a RFID broadcast transmitted by a RFID device;
wherein said visual location system is configured to automatically visually locate said object using said optical block of said camera assembly based on said RFID broadcast received by said RF receiver from said antenna; and
wherein said plurality of camera assemblies comprises a network of multiple camera assemblies, each of said multiple camera assembly units comprising an optical block, an embedded RF receiver and an embedded differential antenna apparatus, said embedded RF receiver being configured to receive from said differential antenna apparatus an RF signal comprising a RFID broadcast transmitted by said RFID device; and
wherein said system is configured to automatically visual locate said object by selecting at least one of said camera assemblies having a field of view corresponding to a location of said RF transmission broadcast by said RFID device and using an optical block of said selected at least one camera assembly based on said RFID broadcast received by said embedded RF receiver of said selected at least one camera assembly.

91. The system of claim 90, wherein each of said camera assemblies comprises a PTZ camera assembly.

92. A visual location system, comprising:
a plurality of camera assemblies, each of said camera assemblies comprising an optical block and a RF receiver;
wherein said RF receiver is configured to receive from a RF antenna one or more RF signals comprising a RFID broadcast transmitted by a RFID device;
wherein said visual location system is configured to automatically visually locate said object using said optical block of said camera assembly based on said RFID broadcast received by said RF receiver from said antenna; and
wherein each of said camera assembly units comprises a differential antenna apparatus that is directionally aligned with said optical block of said camera assembly unit, and wherein said visual location system is further configured to visually align said optical block with said object to visually track said object by moving said optical block based on said RF signal received by said differential antenna apparatus.

93. The method of claim 92, wherein each of said camera assemblies comprises a PTZ camera assembly.

* * * * *

UNITED STATES PATENT AND TRADEMARK OFFICE
CERTIFICATE OF CORRECTION

PATENT NO. : 7,151,454 B2 Page 1 of 1
APPLICATION NO. : 10/732174
DATED : December 19, 2006
INVENTOR(S) : Washington It is certified that error appears in the above-identified patent and that said Letters Patent is hereby corrected as shown below:

Column 29, line 10, delete "BY" and insert --RF--.

Column 32, line 64, delete "a".

Signed and Sealed this

Thirteenth Day of March, 2007

JON W. DUDAS
*Director of the United States Patent and Trademark Office*